United States Patent
Chintalapoodi et al.

(10) Patent No.: US 9,746,975 B2
(45) Date of Patent: Aug. 29, 2017

(54) CAPACITIVE MEASUREMENT PROCESSING FOR MODE CHANGES

(71) Applicant: Synaptics Incorporated, San Jose, CA (US)

(72) Inventors: Prakriti Chintalapoodi, San Jose, CA (US); Nickolas Fotopoulos, San Jose, CA (US); Drew Keppel, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 125 days.

(21) Appl. No.: 14/671,907

(22) Filed: Mar. 27, 2015

(65) Prior Publication Data

US 2016/0282980 A1   Sep. 29, 2016

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
None
See application file for complete search history.

(56) References Cited

U.S. PATENT DOCUMENTS

| | | |
|---|---|---|
| 7,986,313 B2 | 7/2011 | Krah |
| 8,519,975 B2 | 8/2013 | Huang et al. |
| 9,337,832 B2 * | 5/2016 | Buttolo |
| 2003/0063073 A1 * | 4/2003 | Geaghan ............... G06F 3/0416 345/173 |
| 2009/0095540 A1 * | 4/2009 | Zachut .................... G06F 3/044 178/18.03 |
| 2010/0292945 A1 | 11/2010 | Reynolds et al. |
| 2011/0007021 A1 | 1/2011 | Bernstein et al. |
| 2011/0025629 A1 | 2/2011 | Grivna et al. |
| 2012/0044199 A1 | 2/2012 | Karpin et al. |
| 2012/0050211 A1 | 3/2012 | King et al. |
| 2012/0154324 A1 | 6/2012 | Wright et al. |
| 2012/0299874 A1 | 11/2012 | Chang |
| 2013/0093692 A1 * | 4/2013 | Wang .................... G06F 3/0416 345/173 |
| 2013/0100071 A1 | 4/2013 | Wright et al. |

(Continued)

FOREIGN PATENT DOCUMENTS

| | | |
|---|---|---|
| WO | 2013013629 A1 | 1/2013 |
| WO | 2013013633 A1 | 1/2013 |

(Continued)

*Primary Examiner* — Carolyn R Edwards
*Assistant Examiner* — Bipin Gyawali
(74) *Attorney, Agent, or Firm* — Osha Liang LLP

(57) ABSTRACT

Hybrid detection includes determining a first profiles based on multiple capacitive measurements, segmenting the first profiles into one dimensional intervals to obtain multiple segments, determining multiple regions of interest using the segments, and determining a set of contiguous regions based on multiple mutual capacitive measurements. Hybrid detection further includes selecting, from the set of contiguous regions, a set of valid contiguous regions using the regions of interest, and reporting positional information for each contiguous region in the set of valid contiguous regions.

18 Claims, 18 Drawing Sheets

(56) References Cited

U.S. PATENT DOCUMENTS

| | | | |
|---|---|---|---|
| 2013/0147752 A1* | 6/2013 | Simmons | G06F 3/044 345/174 |
| 2013/0278543 A1* | 10/2013 | Hsu | G06F 3/044 345/174 |
| 2014/0204058 A1* | 7/2014 | Huang | G06F 3/0418 345/174 |
| 2014/0267143 A1* | 9/2014 | Worfolk | G06F 3/0416 345/174 |
| 2014/0306724 A1* | 10/2014 | Dassanayake | H03K 17/955 324/658 |
| 2015/0015528 A1* | 1/2015 | Vandermeijden | G06F 3/0416 345/174 |
| 2015/0363043 A1* | 12/2015 | Mikami | G06F 3/044 345/174 |
| 2016/0253041 A1* | 9/2016 | Park | G06F 3/0418 |

FOREIGN PATENT DOCUMENTS

| | | |
|---|---|---|
| WO | 2013013634 A1 | 1/2013 |
| WO | 2013013637 A1 | 1/2013 |

* cited by examiner

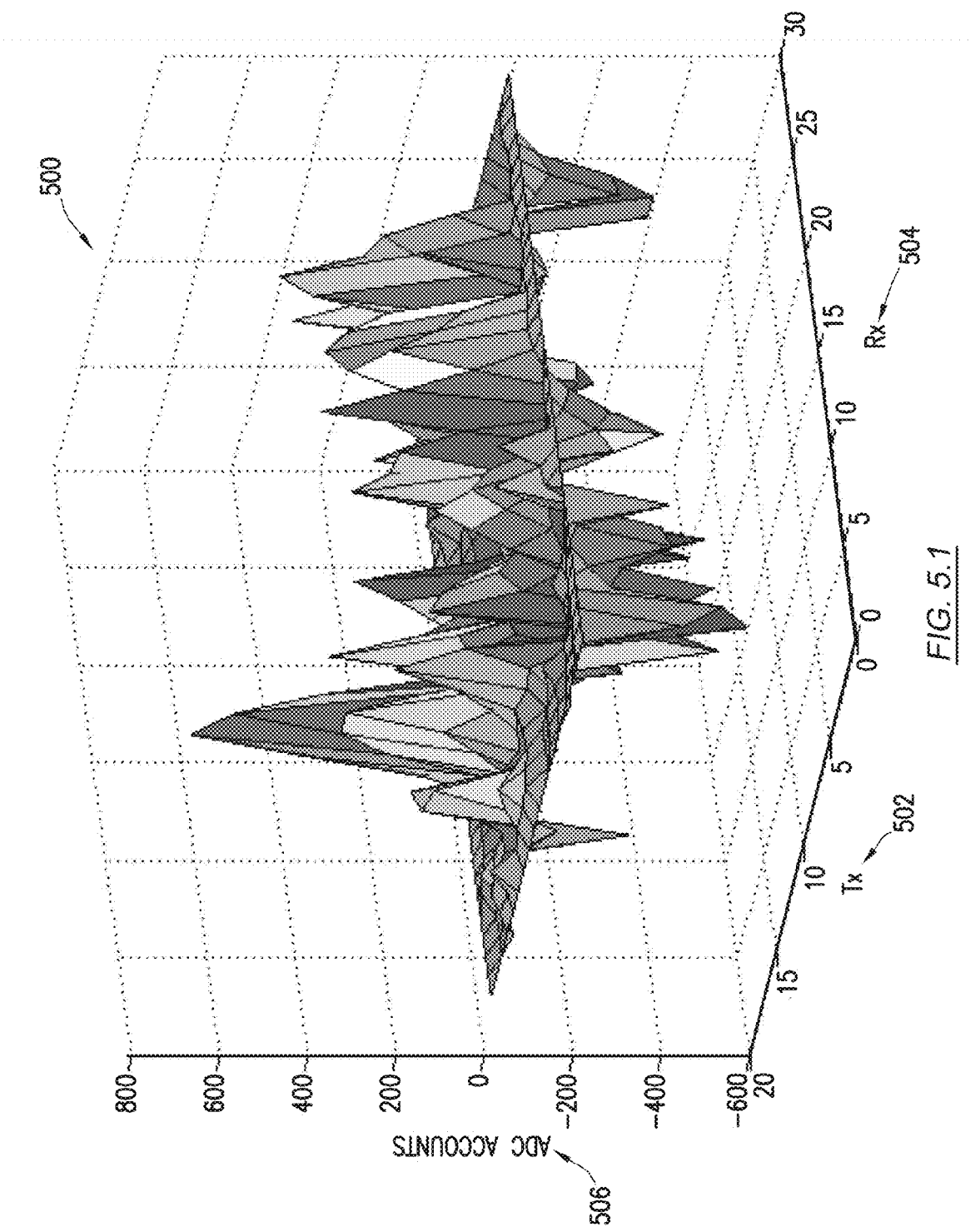
FIG. 5.1

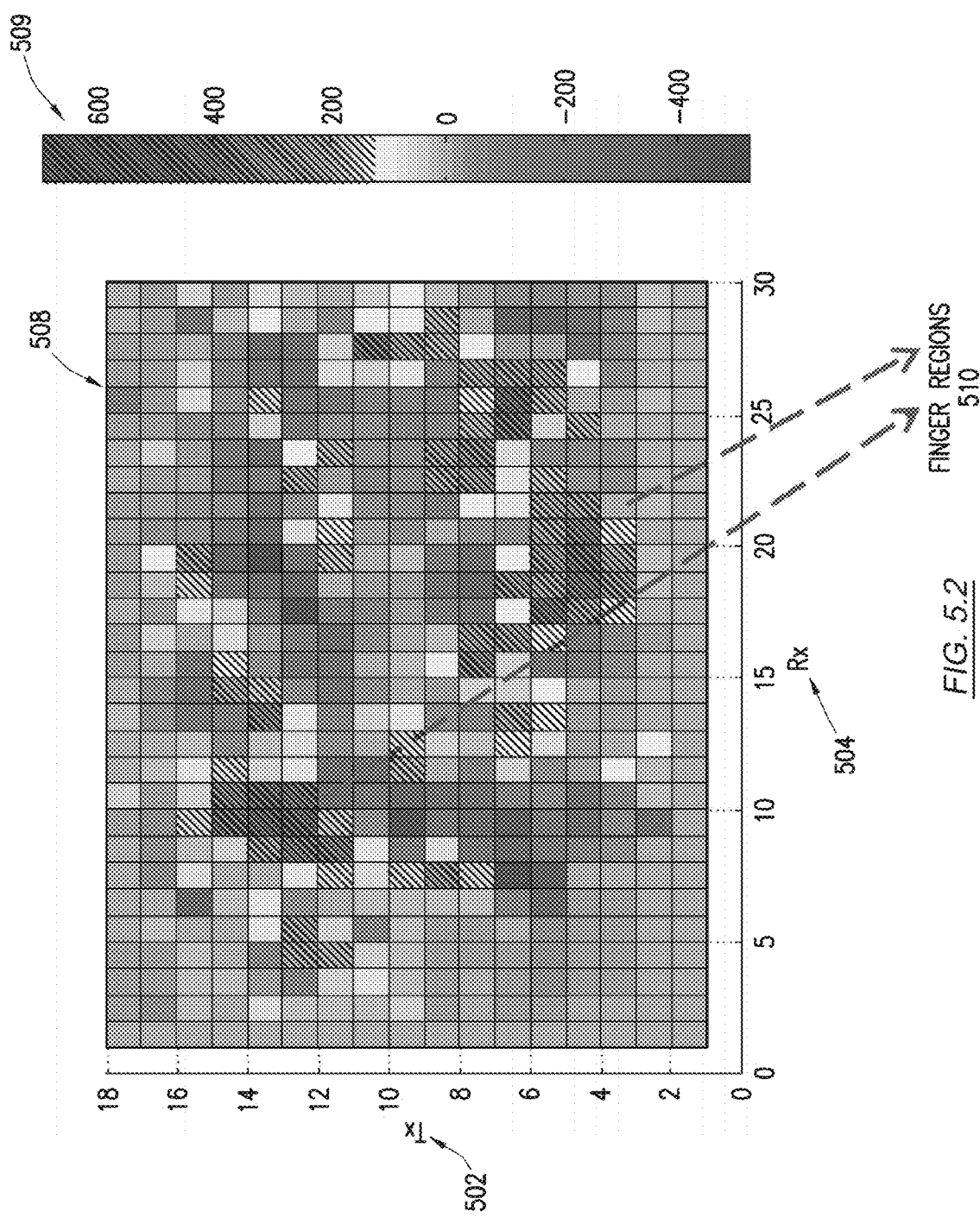
FIG. 5.2

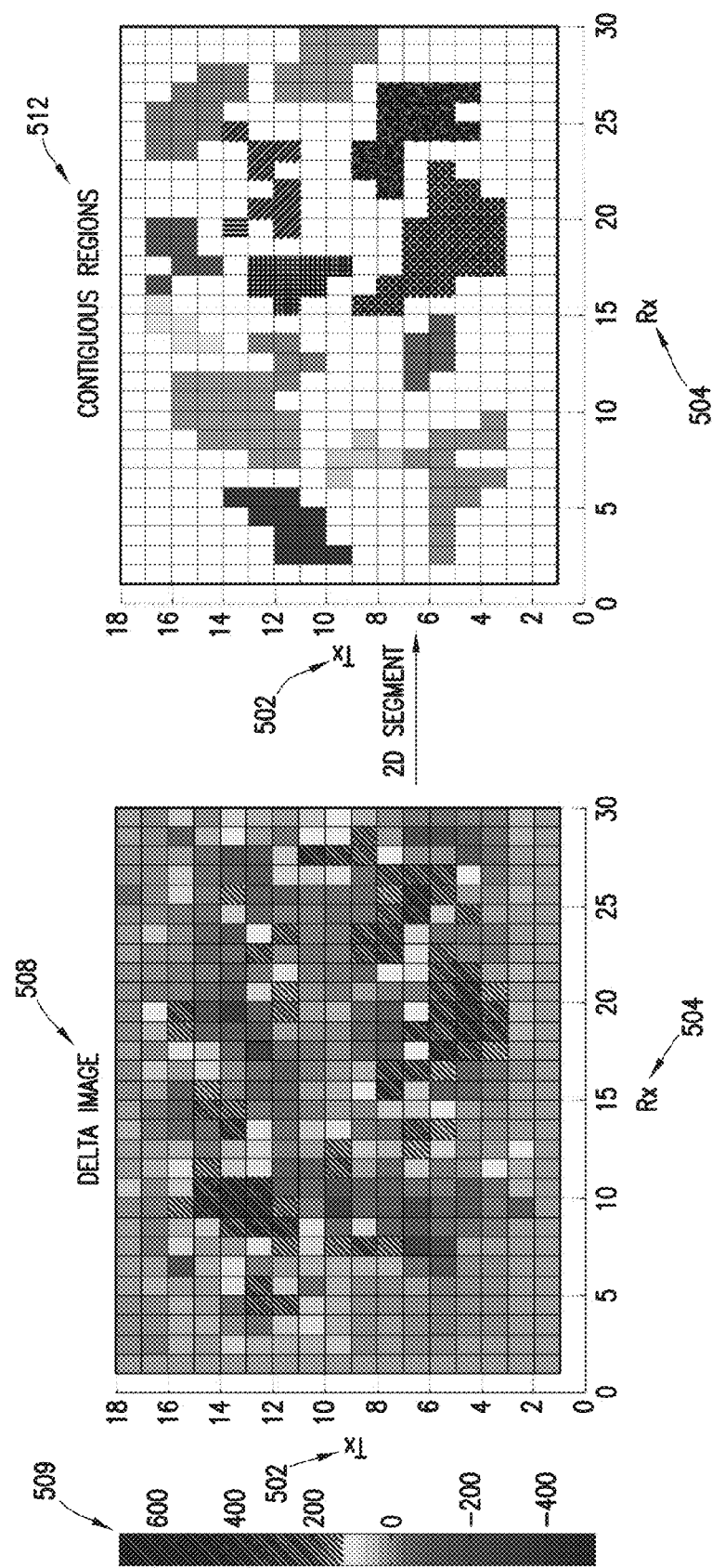
FIG. 5.3

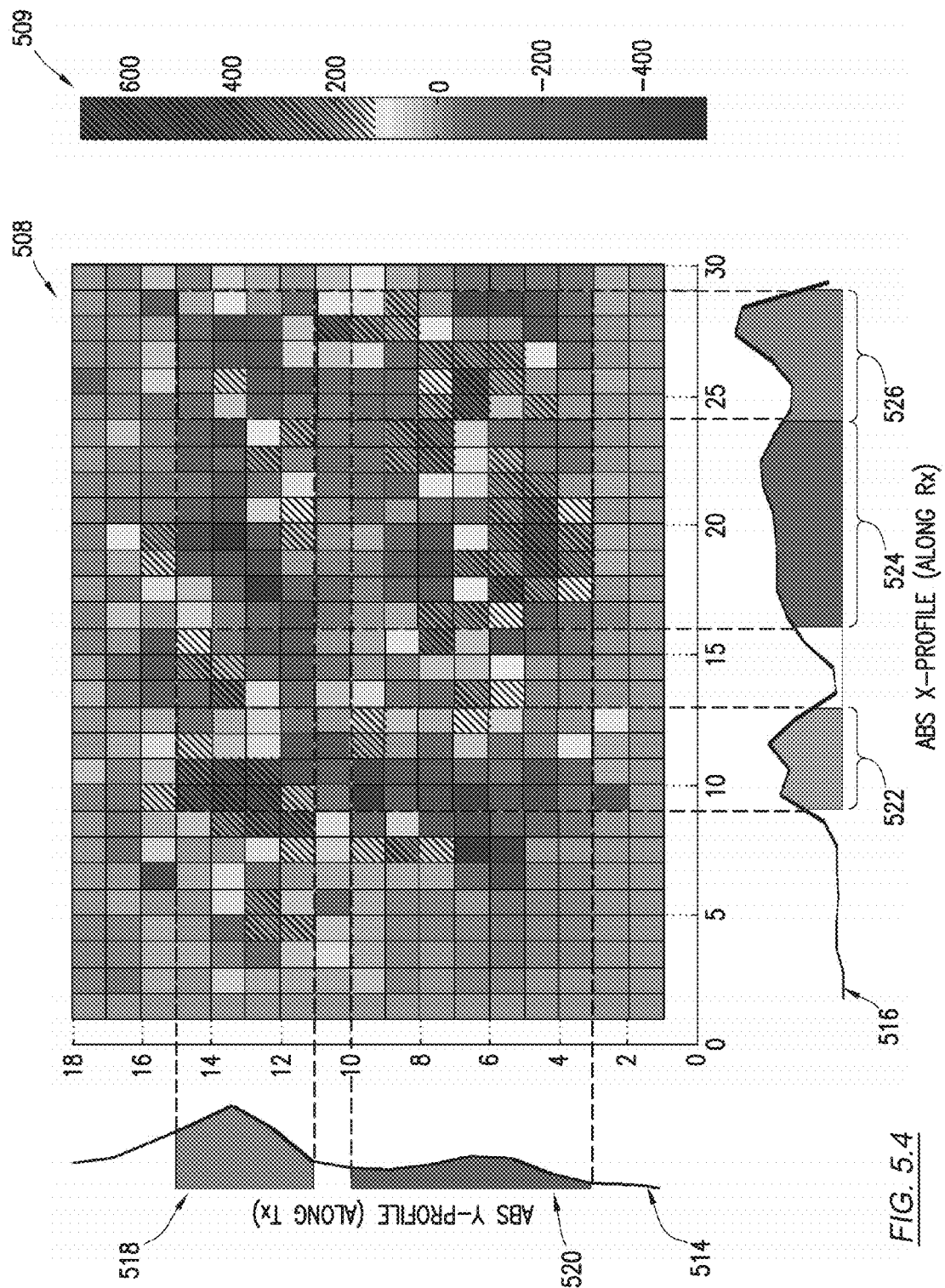
FIG. 5.4

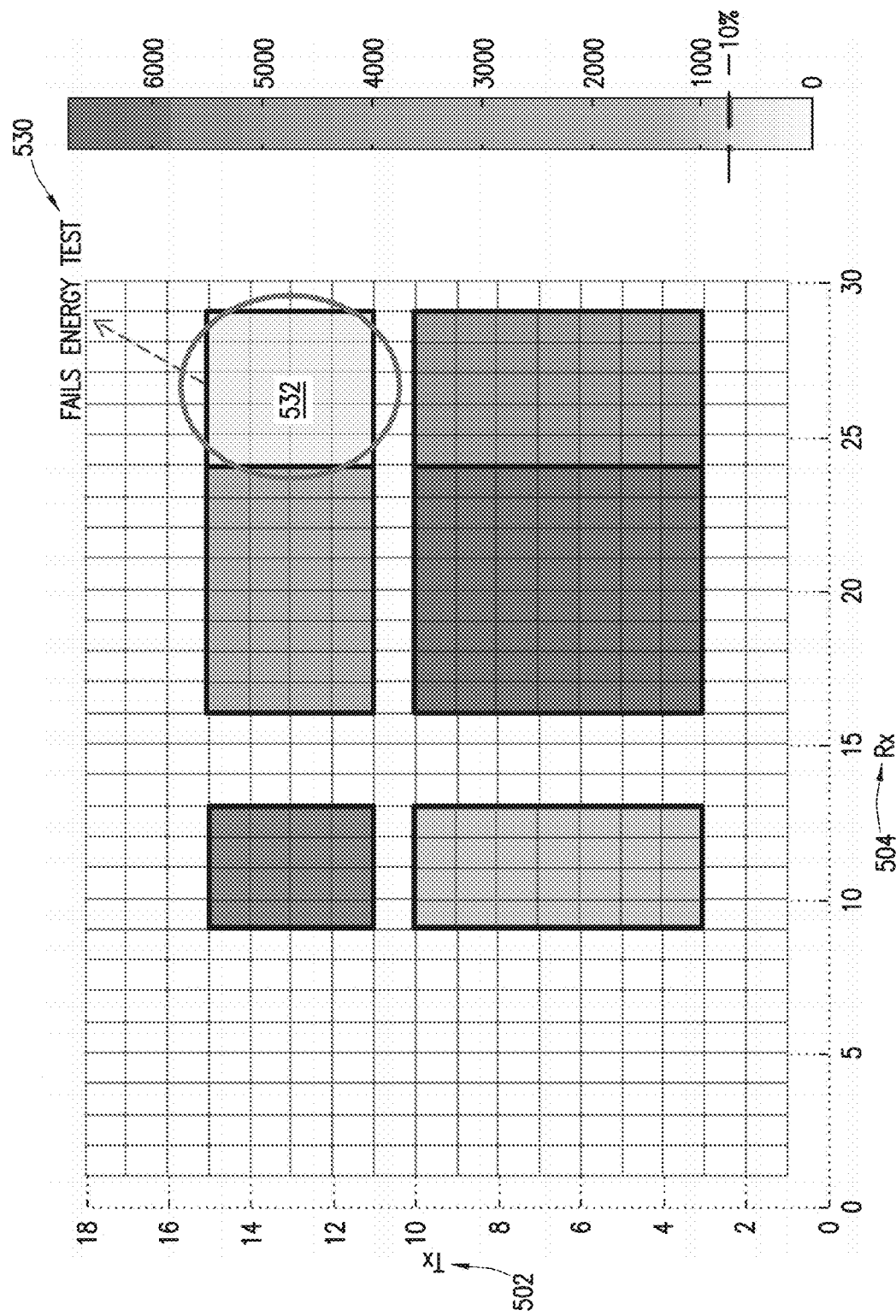
FIG. 5.5

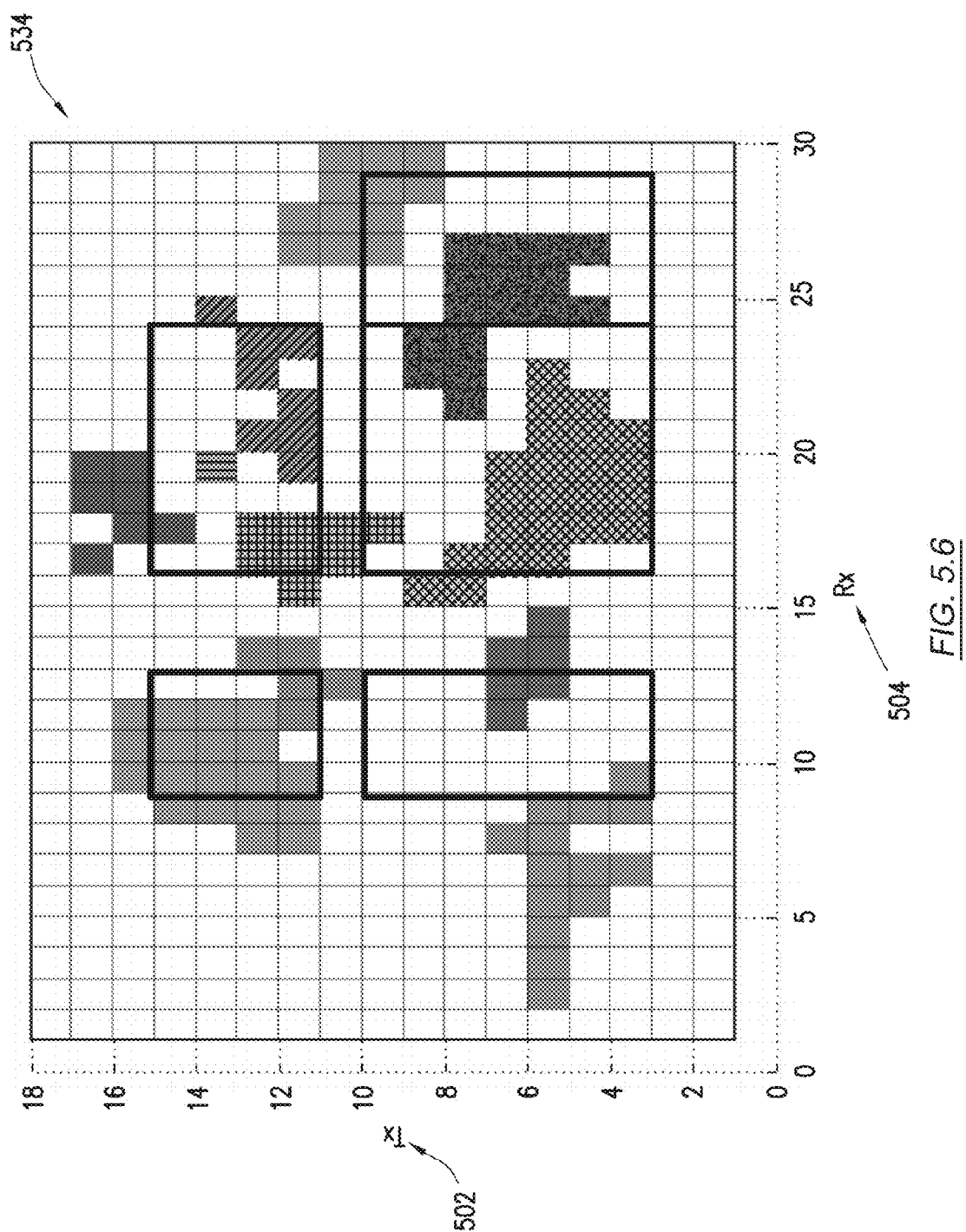
FIG. 5.6

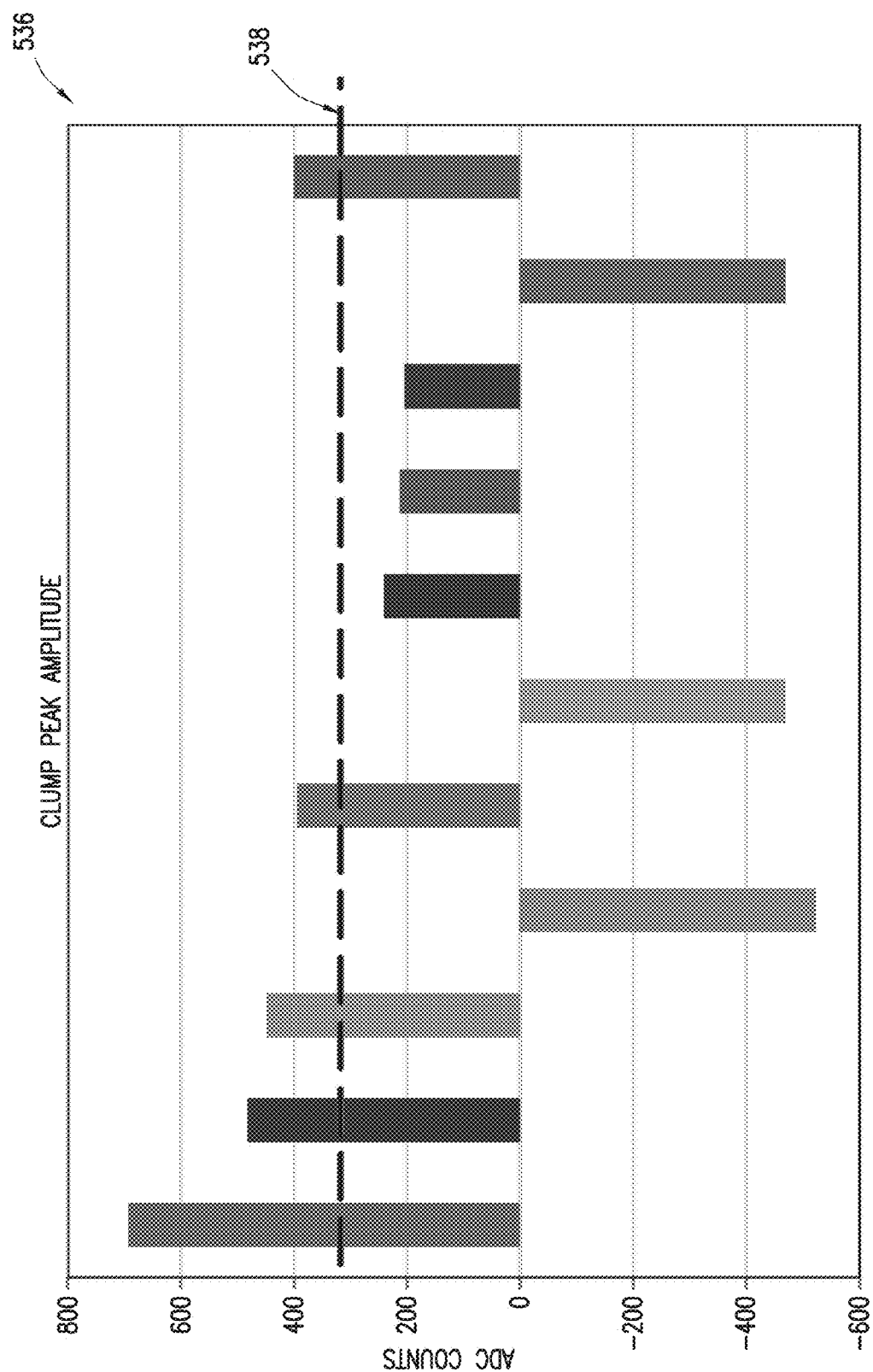
FIG. 5.7

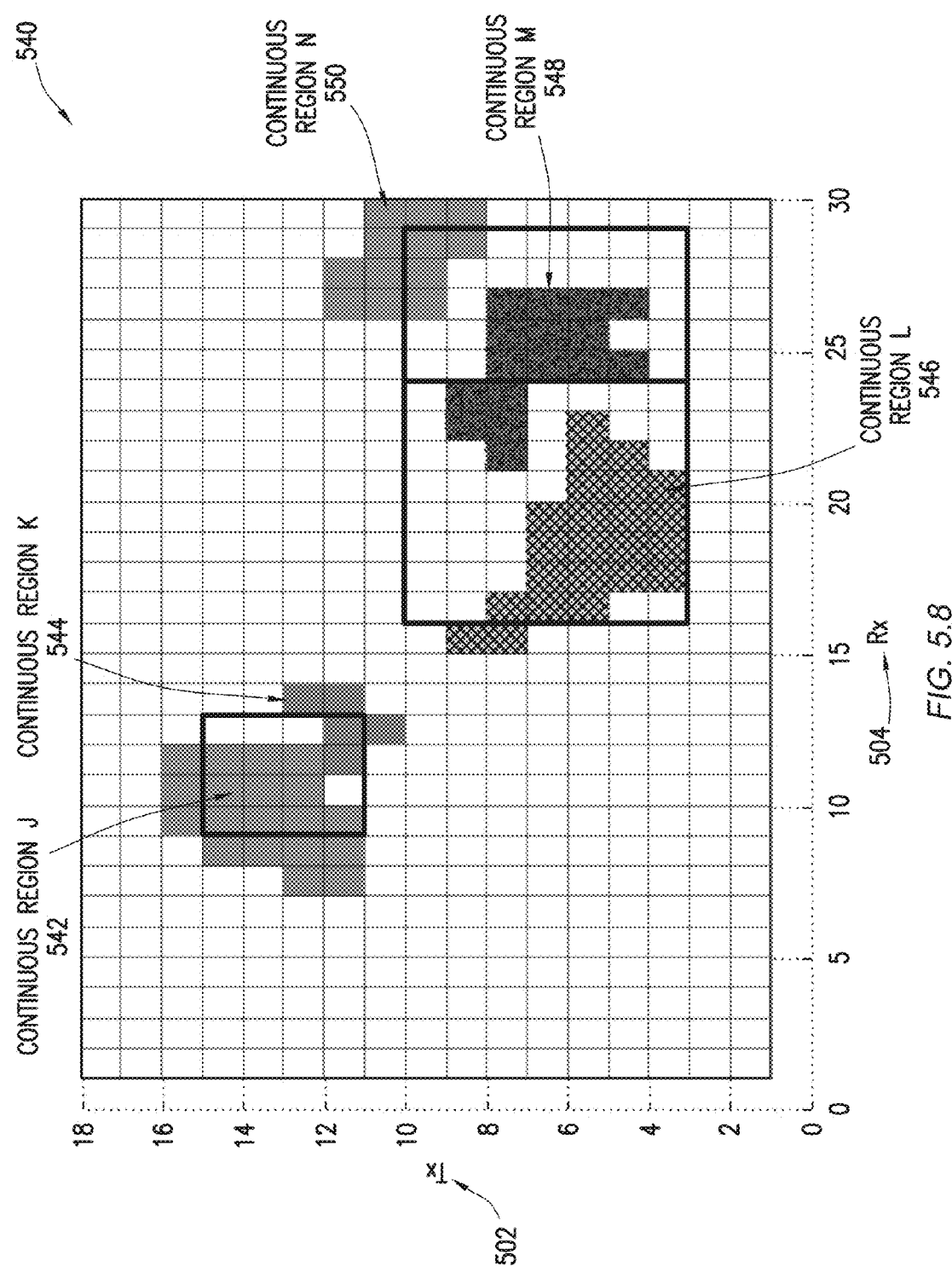
FIG. 5.8

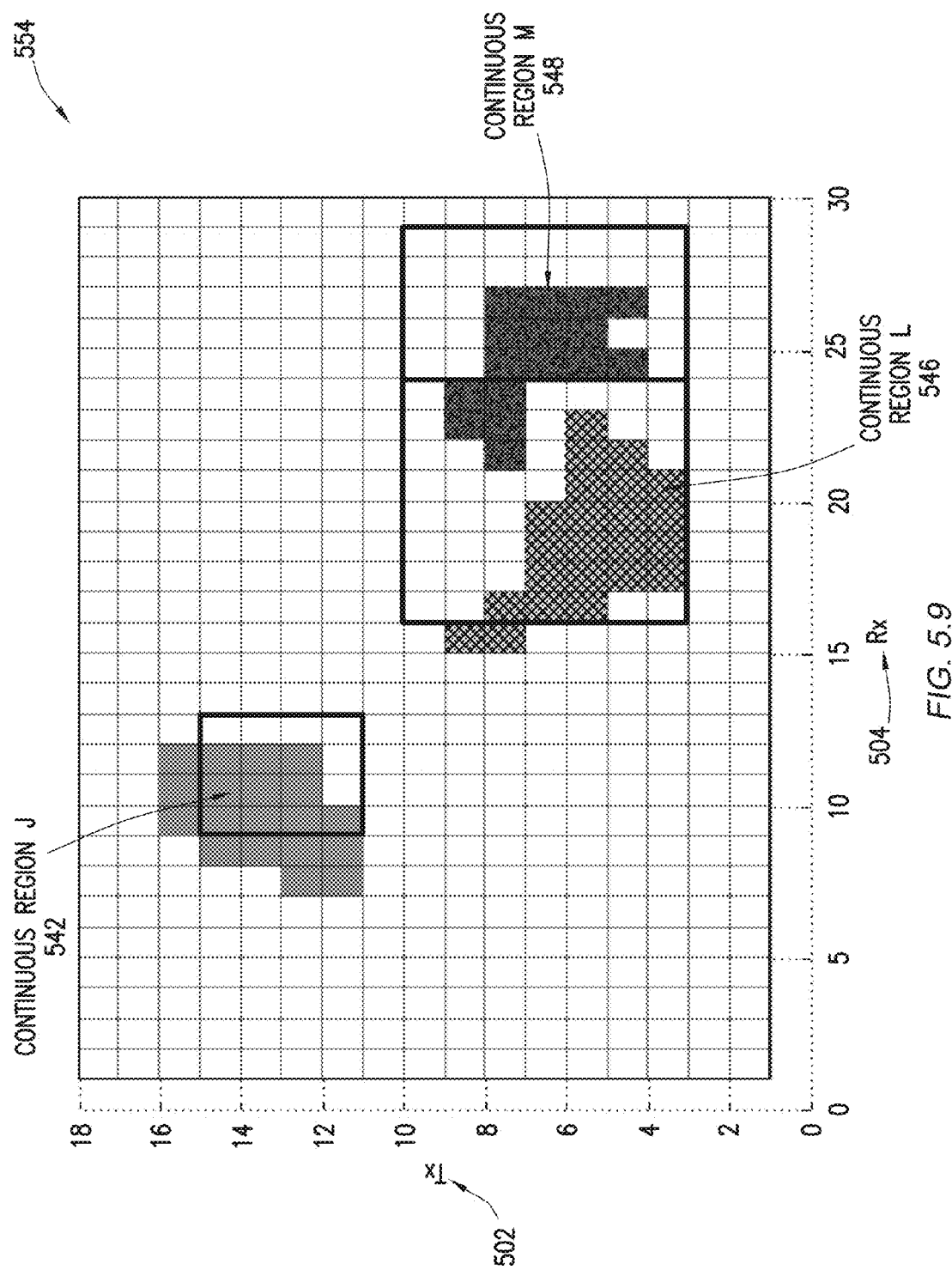
FIG. 5.9

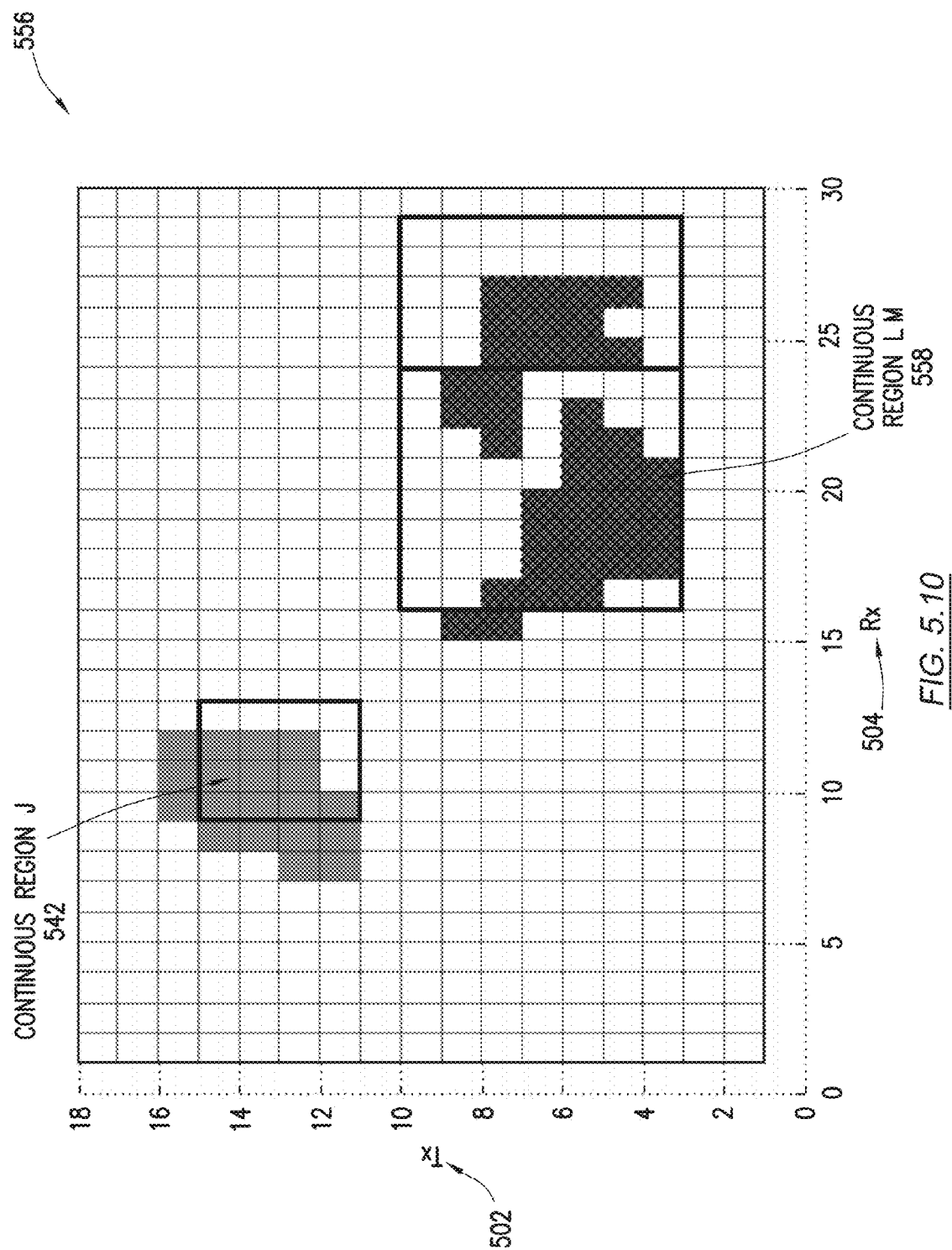

CAPACITIVE MEASUREMENT PROCESSING FOR MODE CHANGES

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a processing system for hybrid detection including a sensor module and a determination module. The sensor module is coupled to multiple sensor electrodes, and is configured to drive a first subset of the sensor electrodes with first transmitter signals, and receive, corresponding to the first transmitter signals, first resulting signals from a second subset of the sensor electrodes. The sensor module is further configured to receive second resulting signals from the second subset while the second subset are driven with modulated signals. The determination module is configured to determine a first profiles based on the second resulting signals, segment the first profiles into one dimensional intervals to obtain multiple segments, determine multiple regions of interest using the segments, and determine a set of contiguous regions based on the first resulting signals. The determination module is further configured to select, from the set of contiguous regions, a set of valid contiguous regions using the regions of interest, and report positional information for each contiguous region in the set of valid contiguous regions.

In general, in one aspect, embodiments relate to a method for hybrid detection including determining a first profiles based on multiple capacitive measurements, segmenting the first profiles into one dimensional intervals to obtain multiple segments, determining multiple regions of interest using the segments, and determining a set of contiguous regions based on multiple mutual capacitive measurements. The method further includes selecting, from the set of contiguous regions, a set of valid contiguous regions using the regions of interest, and reporting positional information for each contiguous region in the set of valid contiguous regions.

In general, in one aspect, embodiments relate to an input device for hybrid detection including multiple sensor electrodes including a first subset and a second subset, and a processing system. The processing system is configured to determine a first profiles based on a first resulting signals obtained based on modulated signals, segment the first profiles into one dimensional intervals to obtain multiple segments, determine multiple regions of interest using the segments, and determine a set of contiguous regions based on a second plurality resulting signals obtained by transmitting transmitter signals using the first subset and receiving resulting signals using the second subset. The processing system is further configured to select, from the set of contiguous regions, a set of valid contiguous regions using the regions of interest, and report positional information for each contiguous region in the set of valid contiguous regions.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

FIGS. 5.1, 5.2, 5.3, 5.4, 5.5, 5.6, 5.7, 5.8, 5.9, and 5.10 show an example in accordance with one or more embodiments of the invention.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In particular, one or more embodiments identify valid contiguous regions based on regions of interest. In particular, valid and invalid contiguous regions may be identified from a mutual capacitance image. Absolute capacitance profiles may be used to determine regions of interest. Using the regions of interest, a set of valid contiguous regions are determined.

Figure 1:
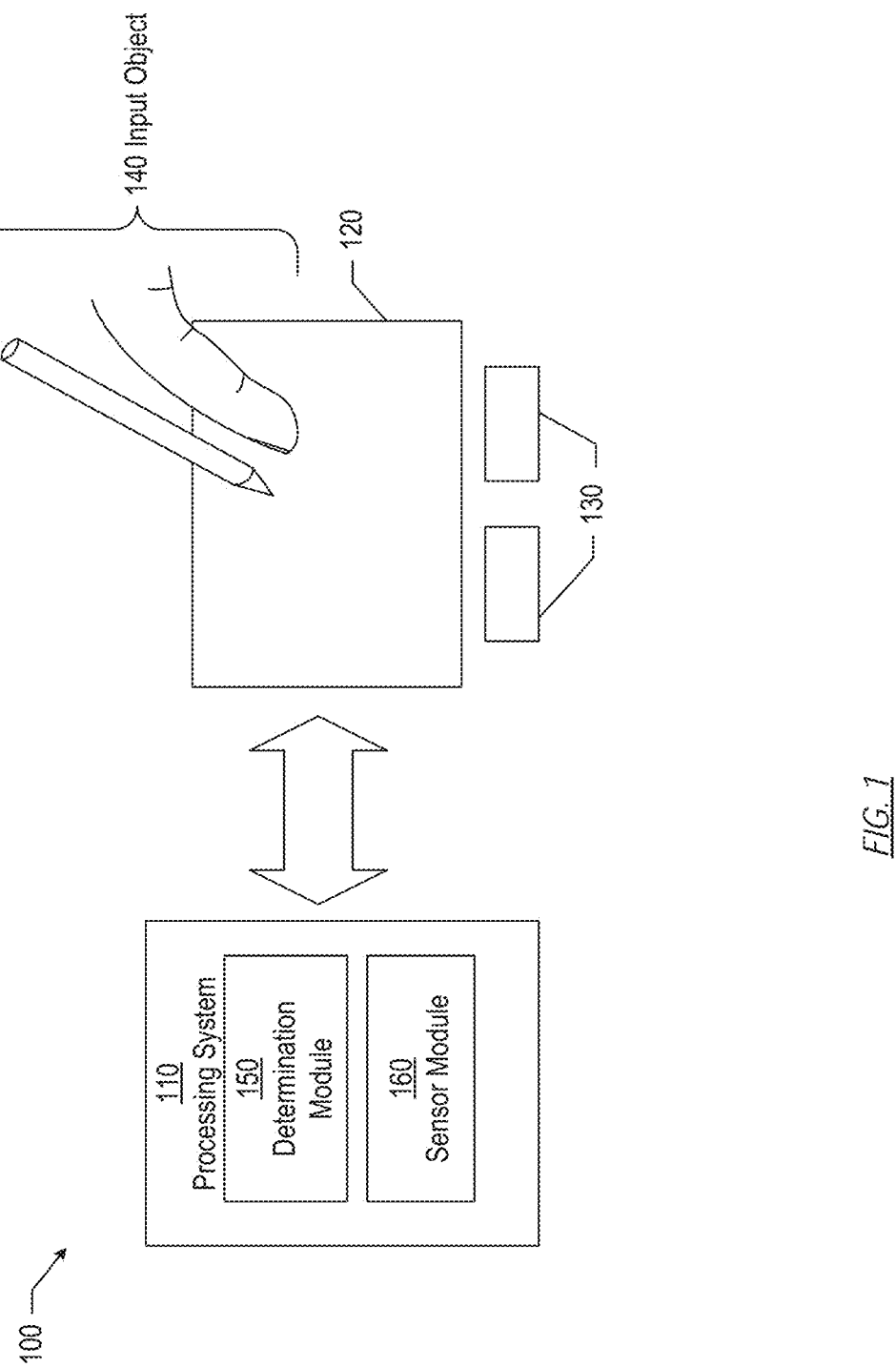
FIGS. 1 and 2 are block diagrams of an example system that includes an input device in accordance with an embodiment of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally, regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
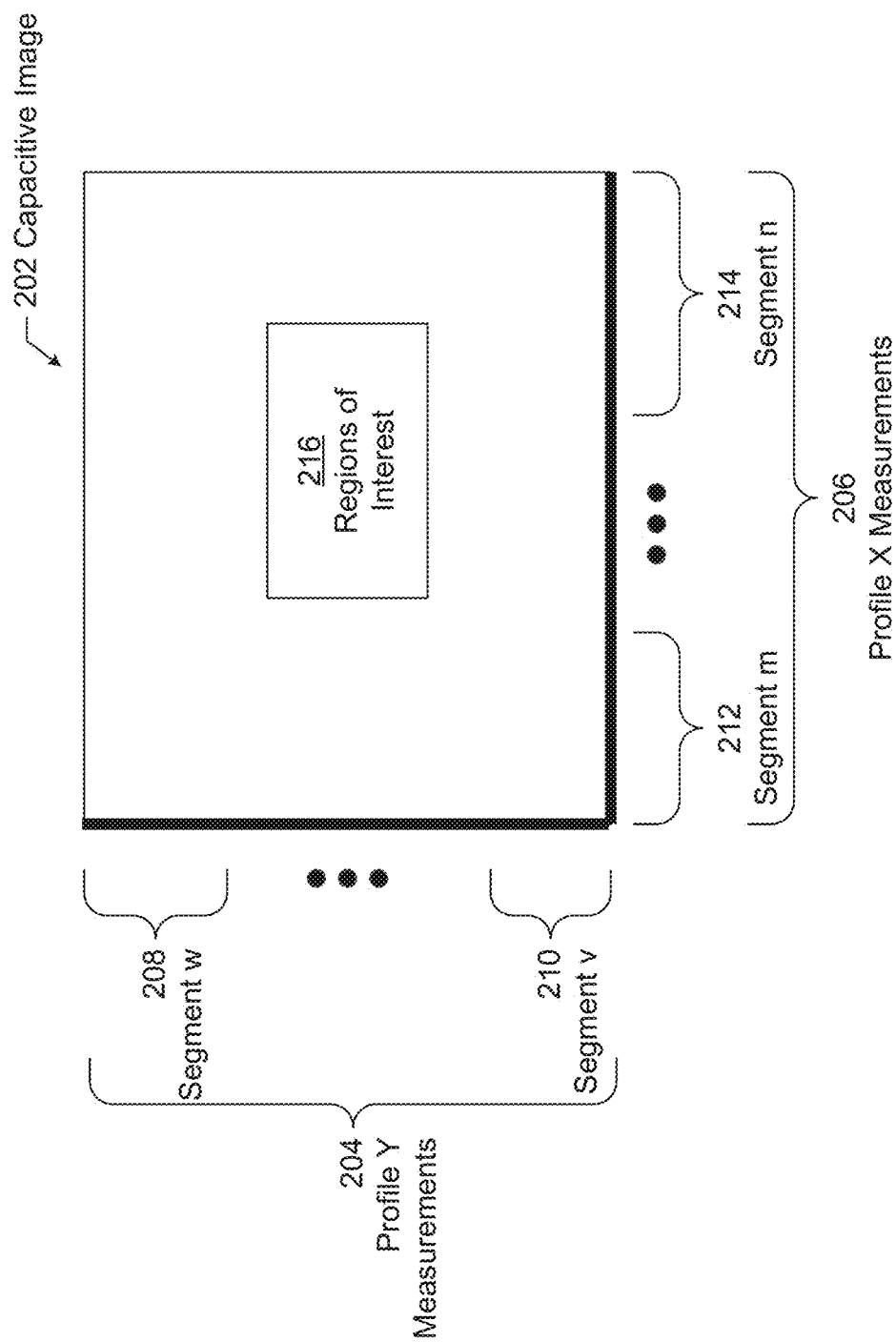

FIG. 2 shows a block diagram of an example system in accordance with one or more embodiments of the invention. In particular, FIG. 2 shows a logical diagram of the sensing region. The sensing region may be partitioned into pixels.

Each pixel may correspond to an intersection between transmitter electrodes and receiver electrodes.

As shown in FIG. 2, a capacitive image (202) is an image of the sensing region that is obtained capacitively. In other words, a capacitive image (202) is a collection of measurements that span the sensing region in accordance with one or more embodiments of the invention. In one or more embodiments of the invention, a measurement may exist in the capacitive image (202) for each pixel.

The capacitive image (202) may include one or more contiguous regions. A contiguous region is a connected section of the sensing region in which each measurement in the connected section satisfies a threshold. Contiguous regions are valid contiguous regions when an input object is detected as being in the contiguous regions. For example, a valid contiguous region may correspond to a portion of the sensing region in which a finger or stylus is present. An invalid contiguous region corresponds a contiguous region that is determined not to correspond to an input object. For example, an invalid contiguous region may correspond to a portion of the sensing region having a water droplet or other moisture present.

In one or more embodiments of the invention, a profile (e.g., profile Y measurements (204), profile X measurements (206)) of the sensing region is a collection of measurements along an axis of the sensing region. In one or more embodiments of the invention, profiles may be obtained using absolute capacitance sensing in which the same sensor electrodes receive resulting signals while being modulated with sensing signals (absolute capacitive signals or modulated signals). A profile may be obtained along each axis, or only on a subset of one or more axes.

In one or more embodiments of the invention, a profile may be divided into segments (e.g., segment w (208), segment v (210), segment m (212), segment n (214)). The segments may be non-overlapping. Further, the combination of segments may or may not span a profile. For example, each segment may satisfy additional characteristics, such as having a single peak measurement value greater than a threshold, having all measurement values greater than a threshold, other criteria, or a combination thereof.

In one or more embodiments, segments define one or more regions of interest (216) in the profile. A region of interest is a contiguous portion of the capacitive image in which an input object may exist as defined by at least one profile (e.g., profile Y measurements (204), profile X measurements (206)). A region of interest may be defined by one or more segments. For example, the borders of the segment(s) may demarcate the borders of the region of interest in the capacitive image. For multiple profiles, the region of interest may be the intersection of regions demarcated by the borders of segments on different profiles. In other words, the segmenting of the absolute capacitance profiles may be used to select contiguous ranges of electrodes. The pixels in the mutual capacitive images that are on the contiguous ranges of electrodes, or intersections thereof in the case of multiple profiles, form the regions of interest.

By way of an example, the region of interest may be the outer product of the profile with a vector of ones or the outer product of multiple profiles with each other. In such a scenario, portions of the profile not in a segment may have a value of zero for the purposes of the outer product. Alternatively, if the outer product of one or more profiles is used, the segmenting of the profile may be deemed to occur if the result of the outer product is segmented based on the above criteria for segmenting.

Although FIG. 2 shows particular configuration of sensing region, profiles, segments, and regions of interest, the particular configuration may change without departing from the scope of the invention. For example, the size and dimensions of the sensing region, positions and numbers of segments, positions of profiles and regions of interest may be different in various embodiments and executions.

Figure 3:
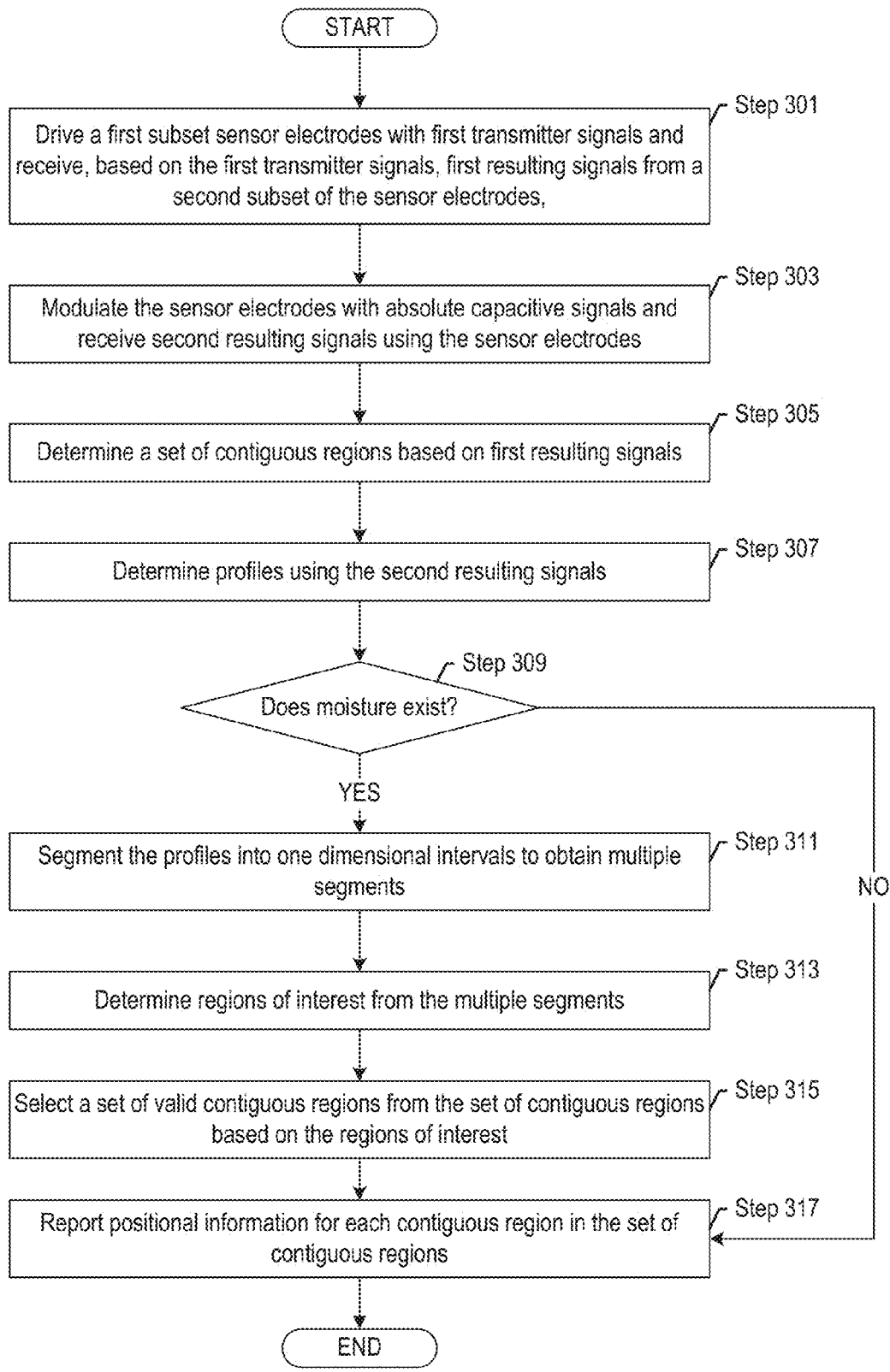
FIGS. 3 and 4 show example flowcharts in accordance with one or more embodiments of the invention.
Figure 4:
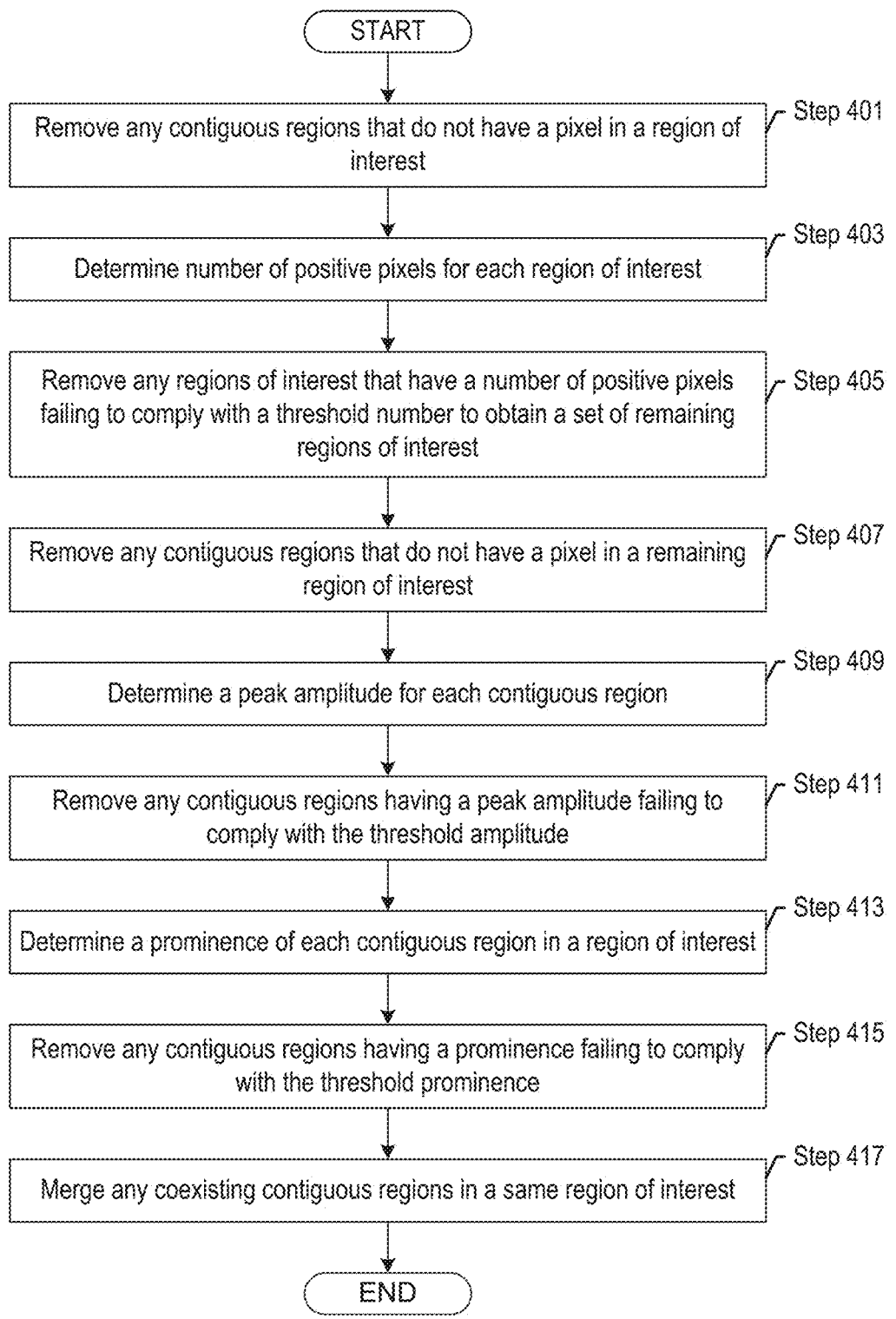

FIGS. 3 and 4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 shows a flowchart in accordance with one or more embodiments of the invention. For example, the steps of FIG. 3 may be performed by the processing system, such as a combination of the sensor module and the determination module.

In Step 301, a first subset of sensor electrodes are driven with first transmitter signals. Further, first resulting signals that are based on the first transmitter signals are received with a second subset of sensor electrodes. In accordance with one or more embodiments of the invention, the subsets of sensor electrodes that transmit the first transmitter signals are different than the subset of receiver electrodes that receive the resulting signals. Further, the resulting signals reflect the transmitter signals, as well as environmental effects and input objects that may be present in the sensing region. In one or more embodiments of the invention, Step 301 corresponds to performing mutual capacitive sensing of the sensing region.

In Step 303, sensor electrodes are modulated with absolute capacitive signals, and used to receive resulting signals. The sensor electrodes may be driven with modulated signals. In accordance with one or more embodiments of the invention, the sensor electrodes that are modulated with the absolute capacitive signals are the same as the sensor electrodes that receive the resulting signals. The sensor electrodes that are modulated and receive in Step 303 may be all or a subset of the total sensor electrodes of the input device. Further, the resulting signals reflect the transmitter signals, as well as environmental effects and input objects that may be present in the sensing region. In one or more embodiments of the invention, Step 303 corresponds to performing absolute capacitive sensing of the sensing region.

In Step 305, a set of contiguous regions are determined based on the first resulting signals in accordance with one or more embodiments of the invention. In one or more embodiments of the invention, capacitive measurements are acquired for the first resulting signals. The capacitive measurements may be processed, such as adjusting for a baseline, performing any other filtering techniques, performing any other processing steps, or a combination thereof. Sets of measurements that satisfy a threshold may be identified and grouped into contiguous regions. A measurement may satisfy a threshold when the value of the measurement relative to the threshold indicates a potential presence of an input object.

In Step 307, profiles are obtained from the second resulting signals in accordance with one or more embodiments of the invention. Similar to Step 305, in one or more embodiments of the invention, capacitive measurements are acquired for the second resulting signals along at least one axis of the sensing region. The capacitive measurements may be processed, such as adjusting for a baseline, performing any other filtering techniques, performing any other processing steps, or a combination thereof.

In Step 309, a determination is made whether moisture exists. Moisture may exist, for example, when fluid droplets are present on the sensing region. Various techniques may be used to determine whether moisture exists. For example, a technique to determine whether moisture exists is discussed below and in FIGS. 6-10. Other techniques may be used without departing from the scope of one or more embodiments of the invention. In some embodiments, additional processing is performed only when moisture is determined to exist in order to adjust for the moisture. Thus, the flow may proceed to Step 317 when moisture is determined not to exist. In other embodiments, the additional processing is performed regardless of whether moisture is determined to exist. If moisture is determined to exist or if additional processing is performed regardless whether moisture exists, the flow may proceed to Step 311.

In Step 311, the profiles are segmented into one dimensional intervals in accordance with one or more embodiments of the invention. Segmenting the profiles may include iterating through the measurements in the profile and determining which measurements or set of measurements satisfy one or more criteria. For example, if a criterion is a minimal detection threshold, then the measurements in the profile may be iterated through to determine which measurements satisfy the minimal detection threshold. By way of another example, if the criterion is only a single peak value of measurements in each segment, then the local maximal values may be identified. The minimal value between peak values may be identified and used as break points separating segments. In the examples, contiguous measurements between break points and/or that satisfy a detection threshold may be grouped into a segment. Other techniques for segmenting the profiles in one dimensional intervals may be used without departing from the scope of the invention.

In Step 313, regions of interest are determined from the multiple segments in accordance with one or more embodiments of the invention. Various techniques may be used to determine the regions of interest from one or more segments. For example, the regions denoted by segments on an axis may be determined. In at least some embodiments, intersections between regions defined by segments on different axes may be used to define regions of interest. In other embodiments, a single profile is used and entire columns or rows may be part of the regions of interest. Other techniques for defining the regions of interest from the segments may be used without departing from the scope of the invention.

In Step 315, a set of valid contiguous regions are selected from the set of contiguous regions based on the regions of interest in accordance with one or more embodiments of the invention. In one or more embodiments of the invention, selecting the set of valid regions may be performed using one or more heuristics. The set of valid contiguous regions may be the regions that satisfy one or more criteria that use the regions of interest in the heuristics. For example, if the criteria is that the contiguous region is entirely or at least partially in the region of interest, then the contiguous regions that are not in the region of interest are omitted from the set of valid contiguous regions. In one or more embodiments of the invention, the set of valid contiguous regions may be empty, include a single valid contiguous region, or may include multiple valid contiguous regions. Prior to proceeding, the set of valid contiguous regions may be further limited to a maximum number, such as two, in one or more embodiments of the invention. In other embodiments, a limit may not be applied.

In Step 317, positional information for each contiguous region in the set of contiguous regions is reported in accordance with one or more embodiments of the invention. In one or more embodiments of the invention, for each valid contiguous region, positional information is determined. Positional information may be determined based on the value of the measurements in the contiguous region. For example, the maximal value of the measurement in each contiguous region may correspond to a position of the input object. The relative value of surrounding values may be used to determine the size and shape of the input object. Other information may also be used to determine positional information. The positional information may be reported to the device driver, the host operating system, another component, or a combination thereof. A host operating system, application or another component may use the positional information to perform an action that changes a software or hardware state. For example, a new application may open, a cursor may move, an option may be selected, the host device may enter low power mode, or another action may be performed.

By using regions of interest in order to select valid contiguous regions, one or more embodiments may be used to determine positional information for multiple input objects in the presence of moisture. For example, zoom may be performed on a tablet computer using two fingers. When a user, using a recipe on the user's tablet computer, cooks in the kitchen, a user may have freshly wash the user's hands and the droplets may be transferred to the user's tablet computer. One or more embodiments of the invention may differentiate between the droplets and the user's fingers when performing the zoom in operation to view the recipe larger. Similarly, one or more embodiments may differentiate between the droplets and a user's single finger to perform a scroll operation. As shown, one or more embodiments may be used to differentiate between input objects and droplets in the presence of moisture.

FIG. 4 shows a flowchart for selecting a set of valid contiguous regions in accordance with one or more embodiments of the invention. FIG. 4 describes removing various contiguous regions. The removal may correspond to any mechanism for not having a particular contiguous region from the set of valid contiguous regions. For example, a bit defined for the contiguous region may be changed to indicate that the contiguous region is invalid. By way of another example, the contiguous region may be deleted. Other mechanisms for removal of a contiguous region may be performed without departing from the scope of the invention.

In Step 401, contiguous regions that do not have a pixel in a region of interest are removed in accordance with one or more embodiments of the invention. The removal of contiguous regions in Step 401 may correspond to removing contiguous regions that are not represented in the absolute capacitance measurements.

In Step 403, the number of positive pixels are determined for each region of interest in Step 403. In one or more embodiments, the positive mutual capacitance measurements in a region of interest are counted to identify the number of positive mutual capacitance measurements in the region of interest. In other words, each pixel that has a positive value in the mutual capacitive measurements are counted. The value of the positive mutual capacitance measurements may be ignored in accordance with one or more embodiments of the invention.

In Step 405, any regions of interest that have a number of positive pixels failing to comply with a minimal threshold number are removed. Failing to comply with the minimal threshold number may be not having at least or not having more than the threshold number. In some embodiments, the threshold number is a constantly defined value. In some embodiments, the threshold number is variable between regions of interest. For example, the threshold may be based on the number of total pixels in the region of interest. In some embodiments, the threshold number may be set based on the count for each of the regions of interest. For example, if the region of interest with the most number of positive pixels has n positive pixels, then the threshold may be set as a percentage of n. By way of another example, if the average number of positive pixels is x or is y percentage of the total number of pixels a region, then the threshold may be set as a particular fraction of x or y.

In Step 407, any contiguous regions that do not have a pixel remaining in a region of interest are removed in accordance with one or more embodiments of the invention. The removal process may be performed in a same or similar manner as discussed above with reference to Step 401 of FIG. 4. Further, if Steps 403 and 405 are performed before Step 401, then Steps 401 and 407 may be combined into a single Step.

Continuing with FIG. 4, in Step 409, the peak amplitude for each contiguous region is determined. In one or more embodiments of the invention, contiguous regions are examined regardless of the region of interest. For each contiguous region, the maximal value in the mutual capacitance measurements in the contiguous is identified. Thus, for a particular region of interest having more than one contiguous region, multiple maximal values may be identified.

In Step 411, any contiguous regions that have a peak amplitude failing to comply with a minimal threshold peak amplitude are removed. Failing to comply with the minimal threshold number may be not having at least or not having more than the threshold peak amplitude. Similar to the threshold number in Step 405, the threshold peak amplitude may be a constantly defined value, variable between contiguous regions, based on the maximal number for any contiguous region, or any other statistic, or a combination thereof.

In Step 413, a prominence of each contiguous region in a region of interest is determined. In one or more embodiments of the invention, contiguous regions may be in virtually any configuration with respect to a region of interest. For example, the contiguous regions may be outside of any region of interest, partially overlap a region of interest, be entirely within a region of interest, or completely envelop a region of interest, or in another configuration with a region of interest. In one or more embodiments of the invention, the prominence is the number of pixels in both the contiguous region and in the region of interest. The number of pixels may be counted. In some embodiments, the prominence may be based on the mutual capacitance measurement values, such as a total of the mutual capacitance measurement values.

In Step 415, any contiguous regions having a prominence failing to comply with a threshold prominence may be removed in accordance with one or more embodiments of the invention. Failing to comply with the threshold prominence may be not having at least or not having more than the threshold prominence. Similar to the threshold number in Step 405, the threshold prominence may be a constantly defined value, variable between contiguous regions, based on the maximal prominence for any contiguous region, or any other statistic, or a combination thereof.

In Step 417, any coexisting contiguous regions in the same regions of interest are merged. Merging may be performed, for example, by linking data structures describing the coexisting contiguous region. Additionally or alternatively, any pixels between contiguous regions in a region of interest may be added to the merged contiguous region.

FIGS. 5.1-5.10 show an example in accordance with one or more embodiments of the invention. FIG. 5.1 shows a three dimensional graph (500) of a mutual capacitance image in accordance with one or more embodiments of the invention. In the three dimensional graph (500), the transmitter axis (502) corresponds to the transmitter electrodes for the sensing region, and the receiver axis (504) corresponds to receiver electrodes for the sensing region. The vertical axis (506) corresponds to the values of the mutual capacitance measurements. The dimensions of the sensing region are for example purposes only and not intended to limit the scope of the invention. As shown in the three dimensional graph (500), some of the measurements may be positive, negative, and zero.

FIG. 5.2 shows an example of the three dimensional graph in FIG. 5.1 in two dimensional space as a two dimensional graph (508). Key (509) shows the maps the fill value for the pixels to the relative measurement values. Thus, the two dimensional graph (508) shows the sensing region with the capacitive image. For the purposes of the example, finger regions (510) or regions in which a user placed the user's fingers are denoted. In practice, the finger regions are identified when the positional information is determined.

FIG. 5.3 shows the example of determining contiguous regions from the mutual capacitance measurements as represented in the two dimensional graph (508) in accordance with one or more embodiments of the invention. As shown by the various shadings in the contiguous regions in FIG. 5.2 in graph (512), multiple contiguous regions may be identified. Each contiguous region includes a set of one or more pixels that are connected. Some of the contiguous regions are invalid and do not correspond to the finger regions in FIG. 5.2. For example, such contiguous regions may correspond to the presence of water droplets or other moisture.

Continuing with the example, FIG. 5.4 shows the two dimensional graph of the mutual capacitive image (508) shown in FIG. 5.2. Along the transmitter and receiver axes are shown a graph of the y profile (514) and the x profile (516). Although FIG. 5.4 shows the profiles as being continuous, the profiles may be a set of discrete values. Each profile in the example is obtained using absolute capacitance sensing.

As shown in FIG. 5.4, the profiles may be segmented into one dimensional segments (e.g., segment A (518), segment B (520), segment C (522), segment E (524), and segment F (526)). In the example, the segmenting may be based on a criterion that a single peak is in the segment and each measurement value in the segment satisfies a threshold.

Other criteria may be used to segment the profiles without departing from the scope of the invention.

Each segment is used to define regions in the two dimensional graph (508) as shown in FIG. 5.4. The intersections of regions defined by the segments on different axes form regions of interest.

FIG. 5.5 shows a two dimensional graph (530) of the regions of interest continuing the example. In particular, FIG. 5.5 shows a test on the regions of interest based on the number of positive pixels in the region of interest. In the example, the number of positive pixels for each region of interest are identified, and all pixels in a region are considered regardless of whether the pixels are in a contiguous region. The maximum number of positive pixels across all regions are identified and multiplied by ten percent to obtain a resulting threshold value. The use of ten percent is for example purposes only. Any region of interest that does not have a number of pixels greater than the resulting threshold value are identified as failing the test. Thus, the region of interest (532) is determined as failing the test and removed.

Continuing with the example and FIG. 5.6, FIG. 5.6 shows a two dimensional graph (534) with the regions of interest overlaid onto the contiguous regions. For each contiguous region, the peak amplitude of the contiguous region is identified. FIG. 5.7 shows a graph of peak amplitudes (536) in accordance with one or more embodiments of the invention. A threshold peak amplitude (538) may be set based on the maximal peak amplitude. Contiguous regions having a peak amplitude less than the threshold may be removed.

FIG. 5.8 shows a two dimensional graph (540) with a resulting contiguous region and regions of interest after the removal in FIGS. 5.5 and 5.7. As shown the contiguous regions are limited to five after the removal process.

Continuing with the example, a prominence of each contiguous region to the region of interest is identified. Contiguous region J (542) has a prominence of 10. Contiguous region K (544) has a prominence of 2. Contiguous region L (546) has a prominence of 21. Contiguous region M (548) has a prominence of 16. Contiguous region n (550) has a prominence of 4. A threshold prominence may be set based on the maximal prominence of 21.

FIG. 5.9 continues the example with the two dimensional graph (554) after contiguous regions failing to satisfy the threshold prominence are removed. Thus, contiguous region J (542), contiguous region L (546), and contiguous region M (548) remain.

In the example, after the heuristics are applied, the contiguous regions may be merged based on being the same region of interest. FIG. 5.10 shows the example two dimensional graph (556) after merging. As shown in the example, contiguous region J (542) remains while contiguous region L and contiguous region M are merged into contiguous region LM (558).

For each contiguous region (i.e., contiguous region J (542) and contiguous region LM (558)) in the example, positional information for a single input object may be determined. Thus, even though moisture may exist causing multiple possible values, positional information for multiple valid input objects may be identified.

The example shown in FIGS. 5.1-5.10 are for example purposes only and not intended to limit the scope of the invention. Other alternative or additional embodiments may exist without departing from the scope of the invention.

As discussed above, one or more embodiments may be performed when moisture is determined to exist in accordance with one or more embodiments of the invention. Determining whether moisture exists may be performed as discussed below with reference to FIGS. 6-10. In FIGS. 6-10 and the discussion below, components and steps that are the same as in FIGS. 1-5.10, may, in at least some embodiments, exist only once or be performed once. For example, although driving transmitter electrodes and receiving resulting signals are discussed above and in FIG. 8, the driving of transmitter electrodes may be performed once and used for both moisture detection and input object identification. In other words, in the example, the same capacitive image may be used for the processing in FIG. 3 as well as FIG. 8.

Figure 6:
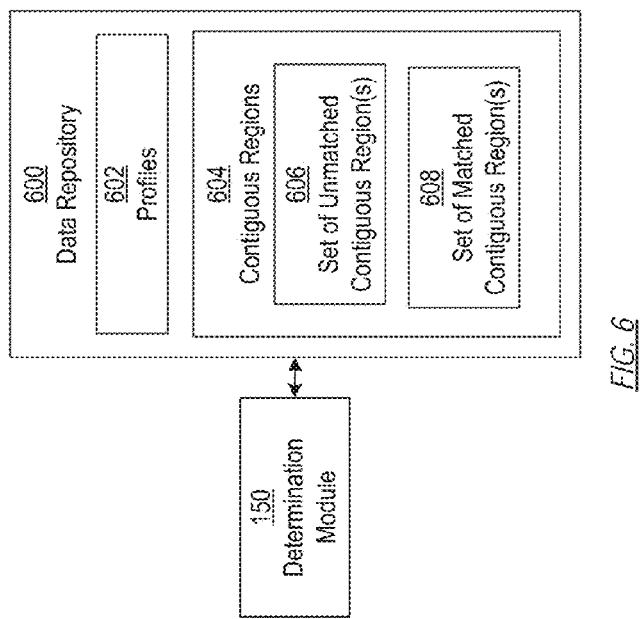

FIG. 6 shows an example block diagram for moisture detection in accordance with one or more embodiments of the invention. As shown in FIG. 6, the determination module (150) may be connected to a data repository (600). The data repository (600) may correspond to any type of storage unit or device for storing data. For example, data repository (600) may correspond to hardware registers, memory modules, data structures, or any other component or a combination thereof.

As shown in FIG. 6, the data repository includes functionality to store one or more profiles (602) and contiguous regions (604). A profile (602) is a collection of capacitive measurements acquired in a single frame through absolute capacitance sensing in accordance with one or more embodiments of the invention. Each profile may be along an axis of the sensing region. Thus, a profile represents a one dimensional collection of measurements.

A contiguous region (604) is a connected section of a sensing region in which each measurement in the connected section satisfies at least one condition indicating a presence of an input object as compared to other locations in the sensing region. In other words, when a measurement satisfies the condition, an input object may be located at the corresponding position of the measurement. For example, the condition may be a threshold value for the measurement. By way of another example, the condition may be based on shape, size, polarity, temporal characteristics, or other characteristics or a combination thereof. Contiguous regions (604) may be unmatched contiguous regions (606) and matched contiguous regions (608).

An unmatched contiguous region (606) is a contiguous region that does not match the measurements acquired via absolute capacitance sensing in accordance with one or more embodiments of the invention. In other words, an unmatched contiguous region (606) is a contiguous region that is not corroborated by absolute capacitance measurements.

A matched contiguous region (608) is a contiguous region that matches absolute capacitance measurements. In particular, a matched contiguous region (608) is corroborated by one or more absolute capacitance measurements. The corroboration may indicate that the contiguous region may correspond to an input object. For example, ghost fingers and water droplets may be reflected in the mutual capacitance measurements and not reflected in the absolute capacitance measurements.

Figure 7:
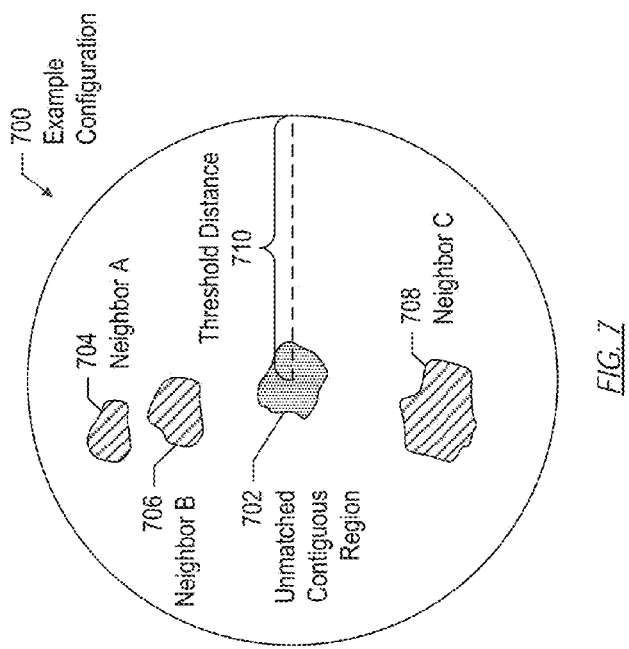
FIGS. 6 and 7 are block diagrams of an example system that includes an input device in accordance with an embodiment of the invention.

FIG. 7 shows an example configuration (700) in accordance with one or more embodiments of the invention. In the example, an unmatched contiguous region (702) has neighbors (e.g., neighbor A (704), neighbor B (706), neighbor C (708)). A neighbor of a particular contiguous region is a contiguous region that is within a threshold distance (710) to the particular contiguous region. The threshold distance may be a numerical value and may be configurable in accordance with one or more embodiments of the invention.

In one or more embodiments of the invention, neighbors may or may not be adjacent to or within line of sight to the particular contiguous region. For example, as shown in FIG. 7, neighbor B (706) is between neighbor A (704) and unmatched contiguous region (702).

Figure 8:
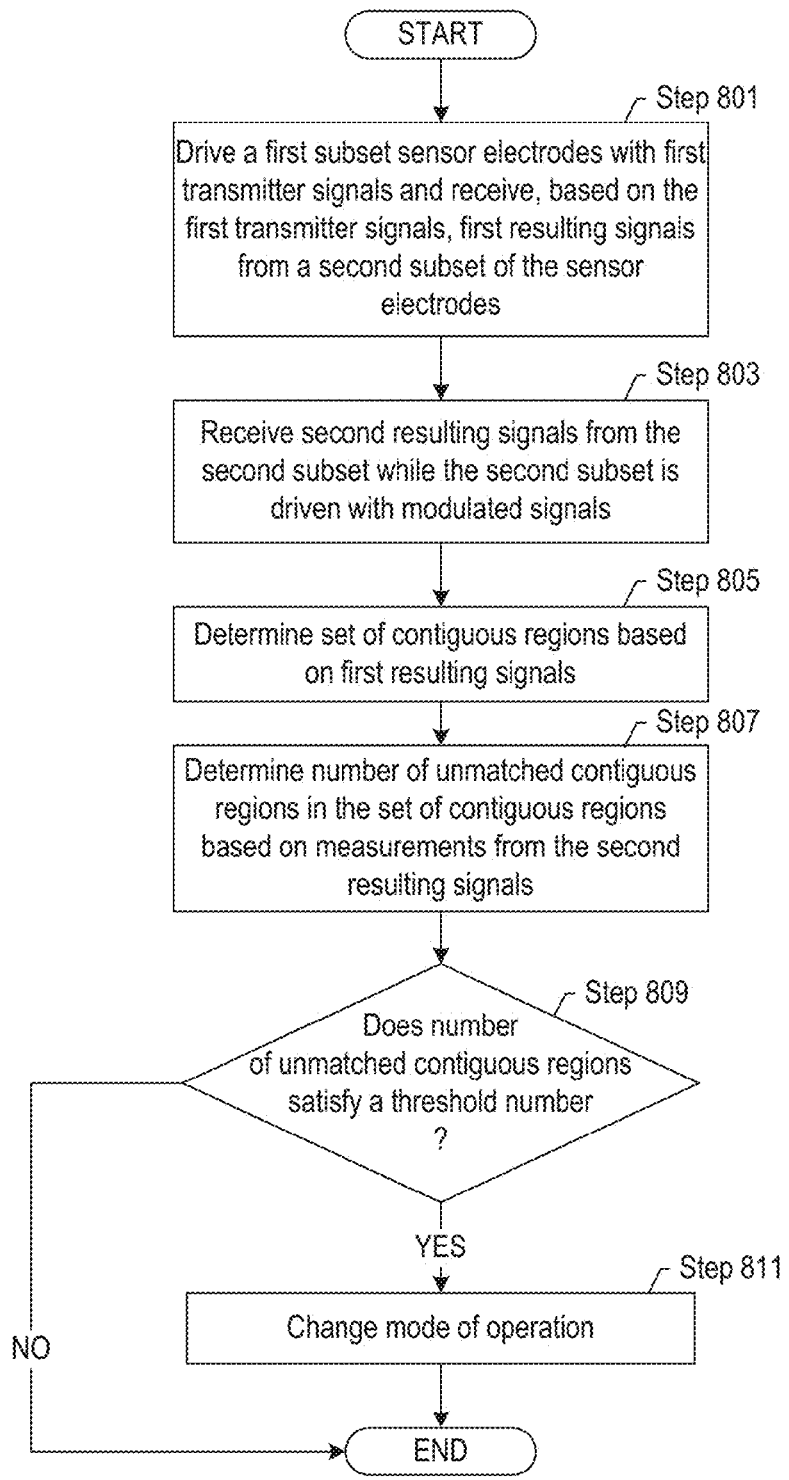
FIGS. 8 and 9 show example flowcharts in accordance with one or more embodiments of the invention.
Figure 9:
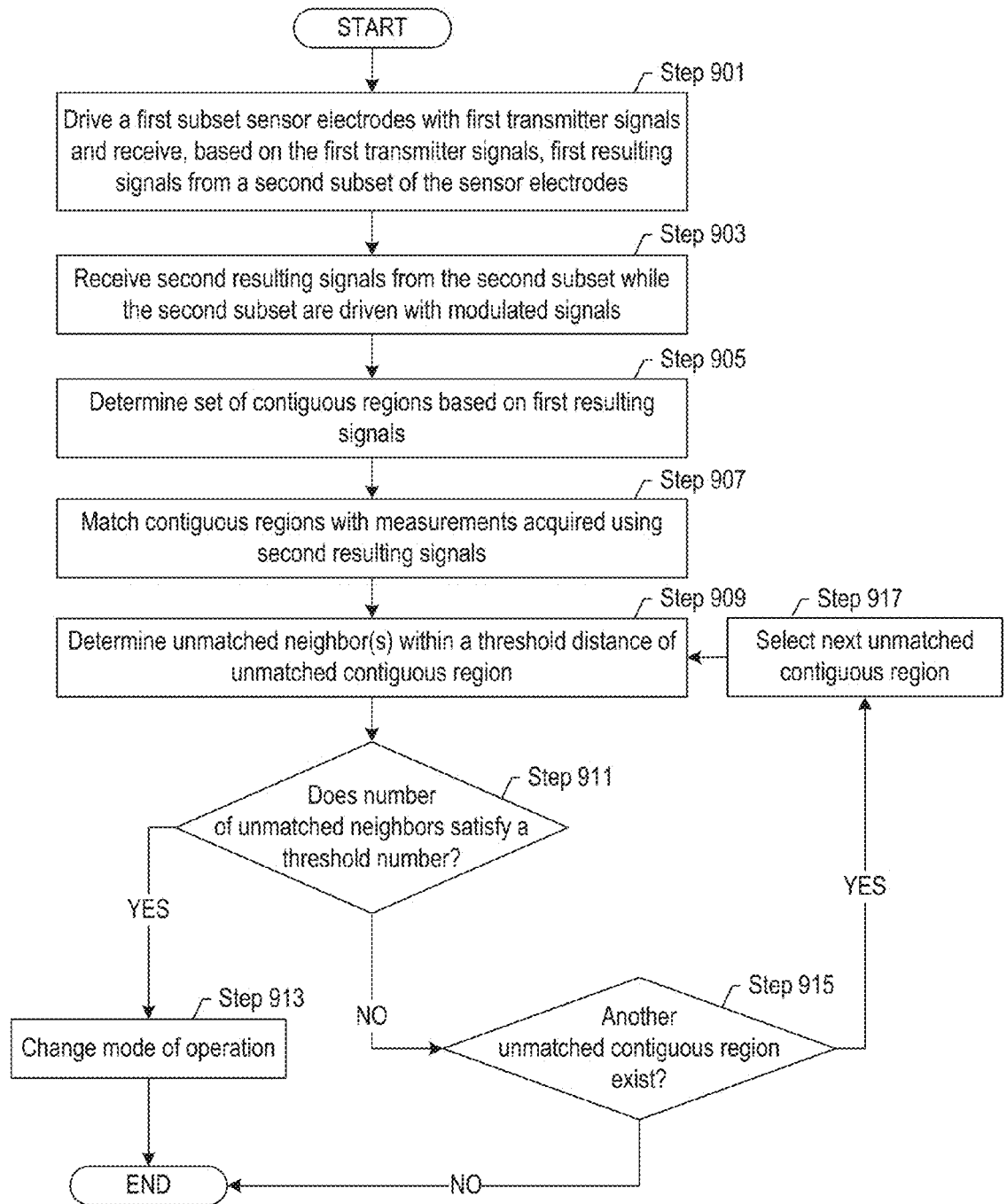

FIGS. 8 and 9 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 8 shows a flowchart in accordance with one or more embodiments of the invention. For example, the steps of FIG. 8 may be performed by the processing system, such as a combination of the sensor module and the determination module.

In Step 801, a first subset of sensor electrodes is driven with first transmitter signals. Further, first resulting signals that are based on the first transmitter signals are received with a second subset of sensor electrodes. In accordance with one or more embodiments of the invention, the subsets of sensor electrodes that transmit the first transmitter signals are different than the subset of receiver electrodes that receive the resulting signals. Further, the resulting signals reflect the transmitter signals, as well as environmental effects and input objects that may be present in the sensing region. In one or more embodiments of the invention, Step 801 corresponds to performing mutual capacitive sensing of the sensing region.

In Step 803, second resulting signals are received from the second subset while the second subset is driven with modulated signals. In one or more embodiments of the invention, sensor electrodes receive resulting signals while being modulated by absolute capacitive signals The sensor electrodes that are modulated with the absolute capacitive signals are the same as the sensor electrodes that receive the resulting signals. The sensor electrodes that are modulated and receive in Step 803 may be all or a subset of the total sensor electrodes of the input device. Additionally, third resulting signals may be received from the first subset while the first subset is driven with modulated signals. The resulting signals reflect the modulated signals, as well as environmental effects and input objects that may be present in the sensing region. In one or more embodiments of the invention, Step 803 corresponds to performing absolute capacitive sensing of the sensing region.

In Step 805, a set of contiguous regions are determined based on the first resulting signals in accordance with one or more embodiments of the invention. In one or more embodiments of the invention, capacitive measurements are acquired for the first resulting signals. The capacitive measurements may be processed, such as adjusting for a baseline, performing any other filtering techniques, performing any other processing steps or a combination thereof. Sets of measurements that satisfy a condition may be identified and grouped into contiguous regions. For example, if the condition is a threshold, a measurement may satisfy the threshold when the value of the measurement relative to the threshold (e.g., greater than, equal to, or less than) indicates a potential presence of an input object. By way of another example, if the condition is based on shape, size, polarity, or temporal characteristics, the sets of measurements satisfy the condition when the sets of measurements combined satisfy the characteristics.

In Step 807, a number of unmatched contiguous regions in the set of contiguous regions may be determined based on the measurements from the second resulting signals. For example, absolute capacitive measurements are acquired for the second resulting signals along at least one axis of the sensing region. The absolute capacitive measurements may be processed, such as adjusting for a baseline, performing any other filtering techniques, performing any other processing steps, or a combination thereof.

Additionally, for each contiguous region, a determination is made whether the contiguous region is corroborated by measurements acquired using absolute capacitance sensing. In other words, the contiguous region is a region in which an input object may be present and a determination is made whether an absolute capacitive measurement that corresponds to the region exists and indicates a presence of an input object. If the contiguous region is not corroborated, then the contiguous region is an unmatched contiguous region. In one or more embodiments of the invention, the corroboration may be required for each set of resulting signals received using absolute capacitive sensing. Thus, for example, if the absolute capacitive measurements are along two axes of the sensing region, then both axes must corroborate the contiguous region for the contiguous region to be a matched contiguous region. In some embodiments, only a single axis is sufficient for corroboration.

The unmatched contiguous regions may be counted to determine a total of unmatched contiguous regions. Different techniques may be used to determine whether a contiguous region is an unmatched contiguous region. Below are some example techniques.

In an example technique, a location in the contiguous region may be selected. For example, the location may be selected based on having a peak or maximal value. By way of another example, the location may be selected based on being in the center of the contiguous region. Further, for each subset of sensor electrodes in which absolute capacitance measurements are acquired in Step 803, the corresponding measurement to the location is identified. If the corresponding measurement or measurements do not satisfy a detection threshold, then the contiguous region may be deemed an unmatched contiguous region.

In another example technique, profiles are obtained from the second resulting signals in accordance with one or more embodiments of the invention. The profiles may be segmented in two dimensional intervals. Segmenting the profiles may include iterating through the measurements in the profile and determining which measurements or set of measurements satisfy one or more criteria. For example, if a criterion is a minimal detection threshold, then the measurements in the profile may be iterated through to determine which measurements satisfy the minimal detection threshold. By way of another example, if the criterion is only a single peak value of measurements in each segment, then the local maximal values may be identified. The minimal value between peak values may be identified and used as break points separating segments. In the examples, contiguous measurements between break points and/or that satisfy a detection threshold may be grouped into a segment. Other techniques for segmenting the profiles in one dimensional intervals may be used without departing from the scope of the invention. Based on the segments, a determination may be made whether the contiguous region, projected onto the axis of the segmented profile, is within a segment. Being within a segment may be based on having a threshold amount (e.g., threshold percentage or threshold number) within the segment. If the contiguous region projected onto the axis of the segmented profile is not within the segment, then the contiguous region may be determined to be an unmatched contiguous region.

The above are only two examples for determining whether a contiguous region is an unmatched or matched contiguous region. Other techniques may be used without departing from the scope of the invention.

In Step 809, a determination is made whether the number of unmatched contiguous regions satisfies a threshold number. If the number of unmatched contiguous regions does not satisfy the threshold number, then the flow may proceed to end.

If the number of unmatched contiguous regions satisfies the threshold number, then a mode of operation may be changed in Step 811. In particular, the number of unmatched contiguous may be indicative that the capacitive images obtained may not be accurate of actual input objects in the sensing region. For example, moisture or other condition may cause inaccurate measurements to exist. Thus, the mode of operation may change to start verifying the mutual capacitive measurements and increase accuracy in identifying positional information of input objects. By changing the mode of operation, one or more embodiments may manage a tradeoff between speed and accuracy with the additional processing.

In one or more embodiments of the invention, after any validation of contiguous regions is performed according to the mode of operation, positional information is determined. Positional information may be determined based on the value of the measurements in the contiguous region. For example, the maximal value of the measurement in each contiguous region may correspond to a position of the input object. The relative value of surrounding values may be used to determine the size and shape of the input object. Other information may also be used to determine positional information. The positional information may be reported to the device driver, the host operating system, another component, or a combination thereof. A host operating system, application or another component may use the positional information to perform an action that changes a software or hardware state. For example, a new application may open, a cursor may move, an option may be selected, the host device may enter low power mode, or another action may be performed.

In some embodiments, rather than considering all contiguous regions when counting number of unmatched contiguous regions, only a subset of contiguous regions may be considered. For example, the subset may be neighbors of the contiguous regions. Using a subset corresponding to the neighbors is discussed below and in FIG. 9.

FIG. 9 shows a flowchart in accordance with one or more embodiments of the invention. In Step 901, a first subset of sensor electrodes are driven with first transmitter signals. Further, first resulting signals that are based on the first transmitter signals are received with a second subset of sensor electrodes. In Step 903, second resulting signals are received from the second subset while the second subset are driven with modulated signals. In Step 905, a set of contiguous regions are determined based on the first resulting signals in accordance with one or more embodiments of the invention. Steps 801, 803, and 805 may be performed in a same or similar manner discussed above with reference to Steps 901, 903, and 905 of FIG. 8.

Turning to Step 907, contiguous regions are matched with measurements acquired using second resulting signals. Matching contiguous regions with measurements acquired using second resulting signals may be performed as discussed above with reference to Step 807 of FIG. 8. However, in Step 907, a set of unmatched contiguous regions may be determined, and further processing may be performed on the set.

In Step 909, unmatched neighbor(s) within a threshold distance of an unmatched contiguous regions are determined in accordance with one or more embodiments of the invention. In particular, an unmatched contiguous region is selected. Neighbors that are unmatched contiguous regions and within a threshold distance of the unmatched contiguous region are identified. For example, the threshold distance may define a circular area surrounding the unmatched contiguous region. Any unmatched contiguous regions in the circular area are identified.

In Step 911, a determination is made whether a number of unmatched neighbors satisfy a threshold number in accordance with one or more embodiments of the invention. In particular, the number of unmatched neighbors within the threshold distance are counted. If the number is greater than the threshold number, then the flow proceeds to Step 913.

In Step 913, the mode of operation is changed in accordance with one or more embodiments of the invention. The mode of operation may change as discussed above with reference to Step 811 of FIG. 8. By way of an example, if the number of unmatched neighbors are greater than a threshold number, then the presence of moisture may be detected. Thus, one or more embodiments may perform additional steps in order to differentiate droplets from actual input objects.

Returning to Step 911, if the number of unmatched neighbors does not satisfy a threshold number, then the flow proceeds to Step 915. In Step 915, a determination is made whether another unmatched contiguous region exists. In particular, a determination is made whether an unmatched contiguous region has not been processed in Steps 909 and 911. If another unmatched contiguous region exists, then the next unmatched contiguous region is selected in Step 917 and the flow returns to Step 909 with the next unmatched contiguous region. In other words, neighbors of each unmatched contiguous region may be counted to determine whether any contiguous region has a number of neighbors that satisfy the threshold number. If the number of neighbors does not satisfy the threshold number for any unmatched contiguous region, then the flow may proceed to end without changing the mode of operation.

Figure 10:
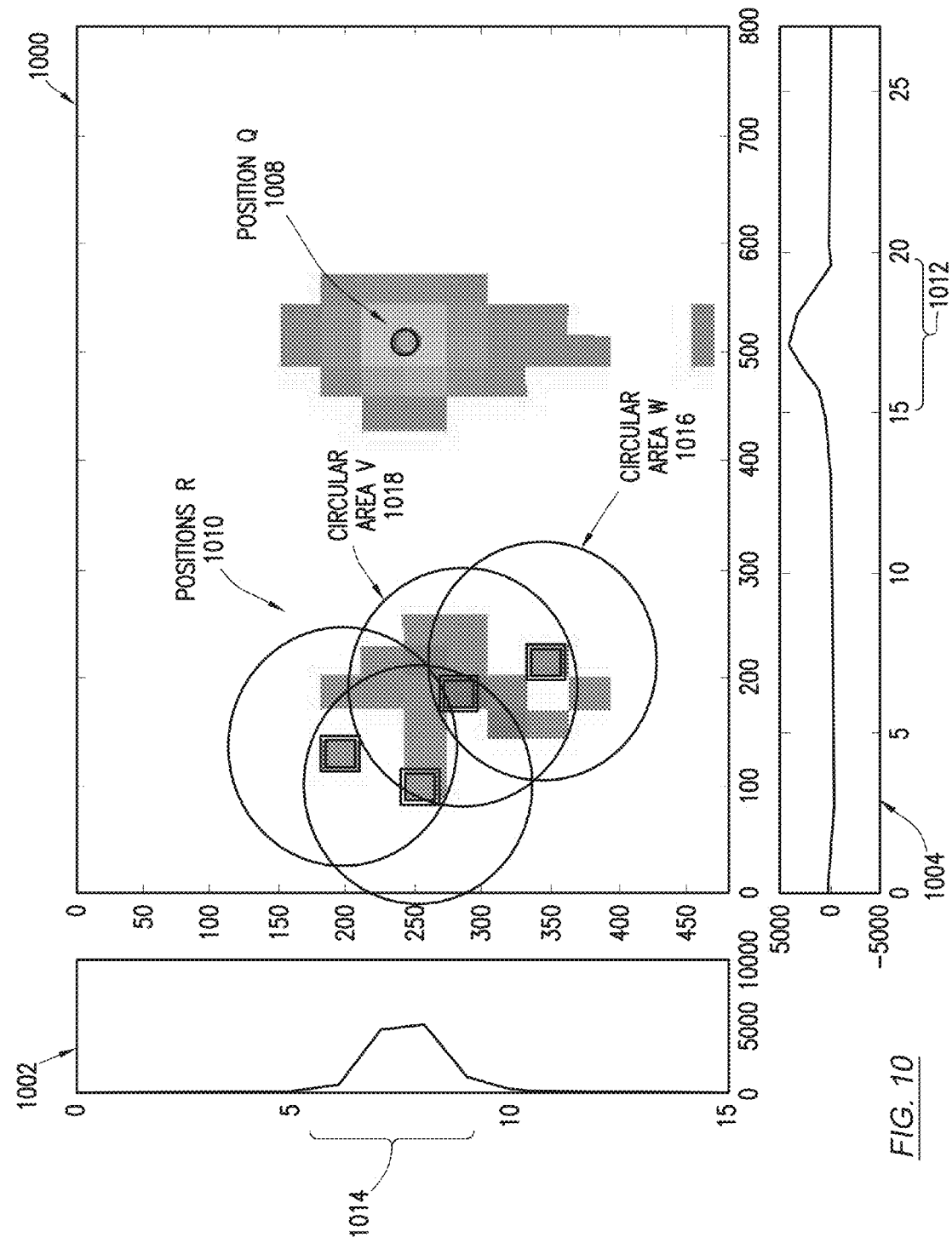
FIG. 10 shows an example in accordance with one or more embodiments of the invention.

FIG. 10 shows an example in accordance with one or more embodiments of the invention. In FIG. 10, a capacitive image (1000) of a sensing region is shown. On the left side of the capacitive image is graph of the y-axis profile (1002) and underneath the capacitive image is a graph of the x-axis profile (1004). Contiguous regions are shown in the capacitive image as rectangles. The remaining regions of the capacitive image do not have any threshold satisfied.

In the example, consider the scenario in which moisture detection is performed. In particular, a user uses the user's smartphone while cooking in the kitchen. While using the smartphone, the user places a finger at position Q (1008) on the sensing region. When the user places a finger at position Q (1008), water droplets from cooking drop at positions R (1010). In the capacitive image, without additional processing, the water droplets may be indistinguishable from input objects.

In the profiles generated from absolute capacitive sensing, the water droplets are not present. Thus, in the x-axis profile a peak exists only at the columns (1012) corresponding to position Q (1008) and not corresponding to positions R (1010). Because many of the water droplets are in the same row as position Q (1008), the y-axis profile at rows (1014) have a peak indicating a presence of an input object.

Determining whether moisture exists may include determining that the contiguous region at positions Q (1008) is a matched contiguous region based on the positions of the peaks in the y-axis profile (1002) and the x-axis profile (1004). Contiguous regions at positions R (1010) are not corroborated by at least the x-axis profile (1004) and, therefore, are unmatched contiguous regions.

Determining whether moisture exists may further be based on the number of neighbors of each unmatched contiguous region. FIG. 10 shows the circular area denoted by the threshold distance for four unmatched contiguous regions (shown as a square in the middle of each circle). Circular area W (1016) includes only a few unmatched contiguous regions and does not satisfy the threshold. However, circular area V (1018) includes more than a threshold number of unmatched contiguous regions. Thus, moisture is detected.

Because of the detection of moisture, additional processing may be performed on the capacitive image to remove effects corresponding to the detection of moisture. Thus, a more accurate identification of input objects may be obtained in at least some embodiments of the invention. As shown through the example, one or more embodiments may be used to detect presence of moisture and droplets even when at least one actual input object is present in the sensing region.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for hybrid detection comprising:
a sensor module coupled to a plurality of sensor electrodes, and configured to:
drive a first subset of the plurality of sensor electrodes with first transmitter signals, receive, corresponding to the first transmitter signals, first resulting signals from a second subset of the plurality of sensor electrodes,
receive second resulting signals from the second subset while the second subset are driven with modulated signals; and
a determination module configured to:
determine a first plurality of profiles based on the second resulting signals,
segment the first plurality of profiles into one dimensional intervals to obtain a plurality of segments;
determine a plurality of regions of interest using the plurality of segments,
determine a set of contiguous regions based on the first resulting signals,
select, from the set of contiguous regions, a set of valid contiguous regions using the plurality of regions of interest, wherein the determination module is further configured to select the set of valid contiguous regions by:
for each contiguous region in the set of contiguous regions, determining a peak amplitude for the contiguous region to obtain a plurality of peak amplitudes, the peak amplitude being determined from the plurality of mutual capacitive measurements,
determining a threshold amplitude from the plurality of peak amplitudes, and
removing each contiguous region from the set of contiguous regions when the peak amplitude for the contiguous region fails to comply with the threshold amplitude to obtain a set of remaining contiguous regions, the set of remaining contiguous regions comprising the set of valid contiguous regions, and
report positional information for each contiguous region in the set of valid contiguous regions.

2. The processing system of claim 1, wherein the determination module is further configured to:
determine a presence of moisture prior to determining the set of valid contiguous regions.

3. The processing system of claim 1, wherein reporting positional information comprises reporting positional information for at least two contiguous regions.

4. The processing system of claim 1, wherein, after selecting, the set of valid contiguous regions comprises more than two contiguous regions, and wherein the set of valid contiguous regions is reduced to two contiguous regions prior to reporting positional information.

5. The processing system of claim 1, wherein selecting the set of valid contiguous regions comprises:
removing any contiguous regions from the set of contiguous regions lacking a pixel in at least one region of interest in the plurality of regions of interest.

6. The processing system of claim 1, wherein selecting the set of valid contiguous regions comprises:
for each region of interest in the plurality of regions of interest,
determining a number of positive pixels for the region of interest, and
removing the region of interest from the plurality of regions of interest when the number of positive pixels fails to comply with a threshold number to obtain a plurality of remaining regions of interest, and removing any contiguous regions from the set of contiguous regions lacking a pixel in at least one region of interest in the plurality of remaining regions of interest.

7. The processing system of claim 1, wherein selecting the set of valid contiguous regions comprises:
for each contiguous region in the set of remaining contiguous regions,
determining a prominence of the contiguous region in a region of interest of the plurality of regions of interest, and
removing the contiguous region from the set of remaining contiguous regions when the prominence of the contiguous region fails to comply with a threshold prominence to further obtain the set of remaining contiguous regions.

8. The processing system of claim 1, wherein selecting the set of valid contiguous regions comprising merging contiguous regions coexisting in a same region of interest of the plurality of regions of interest.

9. A method for hybrid detection comprising:
determining a first plurality of profiles based on a plurality of capacitive measurements;
segmenting the first plurality of profiles into one dimensional intervals to obtain a plurality of segments;
determining a plurality of regions of interest using the plurality of segments;
determining a set of contiguous regions based on a plurality of mutual capacitive measurements;
selecting, from the set of contiguous regions, a set of valid contiguous regions using the plurality of regions of interest, wherein selecting the set of valid contiguous regions comprises:
for each contiguous region in the set of contiguous regions, determining a peak amplitude for the contiguous region to obtain a plurality of peak amplitudes, the peak amplitude being determined from the plurality of mutual capacitive measurements,
determining a threshold amplitude from the plurality of peak amplitudes, and
removing each contiguous region from the set of contiguous regions when the peak amplitude for the contiguous region fails to comply with the threshold amplitude to obtain a set of remaining contiguous regions, the set of remaining contiguous regions comprising the set of valid contiguous regions; and
reporting positional information for each contiguous region in the set of valid contiguous regions.

10. The method of claim 9, further comprising:
determining a presence of moisture prior to determining the set of valid contiguous regions.

11. The method of claim 9, wherein reporting positional information comprises reporting positional information for at least two contiguous regions.

12. The method of claim 9, wherein, after selecting, the set of valid contiguous regions comprises more than two contiguous regions, and wherein the set of valid contiguous regions is reduced to two contiguous regions prior to reporting positional information.

13. The method of claim 9, wherein selecting the set of valid contiguous regions comprises:
removing any contiguous regions from the set of contiguous regions lacking a pixel in at least one region of interest in the plurality of regions of interest.

14. The method of claim 9, wherein selecting the set of valid contiguous regions comprises:
for each region of interest in the plurality of regions of interest,
determining a number of positive pixels for the region of interest, and
removing the region of interest from the plurality of regions of interest when the number of positive pixels fails to comply with a threshold number to obtain a plurality of remaining regions of interest, and
removing any contiguous regions from the set of contiguous regions lacking a pixel in at least one region of interest in the plurality of remaining regions of interest.

15. The method of claim 9, wherein selecting the set of valid contiguous regions comprises:
for each contiguous region in the set of remaining contiguous regions,
determining a prominence of the contiguous region in a region of interest of the plurality of regions of interest, and
removing the contiguous region from the set of remaining contiguous regions when the prominence of the contiguous region fails to comply with a threshold prominence to further obtain the set of remaining contiguous regions.

16. The method of claim 9, wherein selecting the set of valid contiguous regions comprising merging contiguous regions coexisting in a same region of interest of the plurality of regions of interest.

17. An input device for hybrid detection comprising:
a plurality of sensor electrodes comprising a first subset and a second subset; and
a processing system configured to:
determine a first plurality of profiles based on a first plurality of resulting signals obtained based on modulated signals,
segment the first plurality of profiles into one dimensional intervals to obtain a plurality of segments;
determine a plurality of regions of interest using the plurality of segments,
determine a set of contiguous regions based on a second plurality resulting signals obtained by transmitting transmitter signals using the first subset and receiving resulting signals using the second subset,
select, from the set of contiguous regions, a set of valid contiguous regions using the plurality of regions of interest, wherein the processing system is further configured to select the set of valid contiguous regions by:
for each contiguous region in the set of contiguous regions, determining a peak amplitude for the contiguous region to obtain a plurality of peak amplitudes, the peak amplitude being determined from the plurality of mutual capacitive measurements,
determining a threshold amplitude from the plurality of peak amplitudes, and
removing each contiguous region from the set of contiguous regions when the peak amplitude for the contiguous region fails to comply with the threshold amplitude to obtain a set of remaining contiguous regions, the set of remaining contiguous regions comprising the set of valid contiguous regions, and
report positional information for each contiguous region in the set of valid contiguous regions.

18. The input device of claim 17, wherein selecting the set of valid contiguous regions comprises reducing the set of contiguous regions according to a plurality of heuristics.

* * * * *